US012593326B2

(12) United States Patent　　　　　(10) Patent No.:　US 12,593,326 B2
　　　Esswie　　　　　　　　　　　　　　(45) Date of Patent: 　　Mar. 31, 2026

(54) AUTONOMOUS CONFIGURED GRANT SCHEDULING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 18/506,877

(22) Filed: Nov. 10, 2023

(65) Prior Publication Data

US 2025/0159673 A1　　May 15, 2025

(51) Int. Cl.
　　*H04W 72/12*　　　　(2023.01)
　　*H04W 72/543*　　　(2023.01)
(52) U.S. Cl.
　　CPC ......... *H04W 72/12* (2013.01); *H04W 72/543* (2023.01)
(58) Field of Classification Search
　　CPC ........................... H04W 72/12; H04W 72/543; H04W 28/0268
　　See application file for complete search history.

(56) References Cited

U.S. PATENT DOCUMENTS

| | | | |
|---|---|---|---|
| 2021/0068003 A1* | 3/2021 | Kadiri | ................... H04L 1/1812 |
| 2023/0319125 A1* | 10/2023 | Paris | .................. H04N 21/2408 |
| | | | 709/238 |
| 2024/0107524 A1* | 3/2024 | Kuo | ................... H04W 72/232 |

FOREIGN PATENT DOCUMENTS

| | | |
|---|---|---|
| EP | 4221386 | 8/2023 |
| KR | 102577189 | 9/2023 |
| KR | 1020230153250 | 11/2023 |
| WO | 2022/267603 | 12/2022 |
| WO | 2023/103919 | 6/2023 |

OTHER PUBLICATIONS

International Search Report and Written Opinion mailed Jul. 1, 2024 for PCT Application No. PCT/US2024/013872, 14 pages.

* cited by examiner

*Primary Examiner* — Khoa Huynh
(74) *Attorney, Agent, or Firm* — Amin, Turocy & Watson, LLP

(57)　　　　　　ABSTRACT

An extended reality processing unit may determine a roundtrip time corresponding to an XR appliance communicatively coupled with the processing unit and may transmit the roundtrip time to a serving radio network node. The node may transmit a multimodal uplink resource configuration to the processing unit. The processing unit may receive a multimodal downlink packet from the node and may determine whether a quality-of-service criterion corresponding to the downlink packet can be satisfied by relaying of a multimodal uplink packet generated by the appliance. The processing unit may transmit to the appliance a delivery mode indication, which may indicate relaying of the multimodal uplink packet to the node by the processing unit if relaying would likely satisfy the quality-of-service criterion, or the indication may indicate direct transmission of the uplink packet to the node by the appliance if relaying by the processing unit would not satisfy the quality-of-service criterion.

20 Claims, 15 Drawing Sheets

A method, comprising receiving, by a user equipment comprising a processor from a radio access network node, a multimodal resource grant configuration comprising at least one multimodal resource grant indication indicative of at least one multimodal resource usable to facilitate delivery of multimodal uplink traffic with respect to at least one extended reality ("XR") appliance ⌐1105 determining, by the user equipment, at least one round trip time value corresponding to at least one communication link associated with the at least one XR appliance ⌐1110 receiving, by the user equipment from the radio access network node, a multimodal downlink traffic protocol data unit, corresponding to at least one multimodal traffic flow, directed to the at least one XR appliance, wherein the at least one multimodal traffic flow is associated with a quality-of-service criterion ⌐1115 analyzing, by the user equipment, the at least one multimodal resource with respect to at least the multimodal downlink traffic protocol data unit and the at least one round trip time value to result in an analyzed at least one multimodal resource ⌐1120 based on the analyzed at least one multimodal resource being determined to satisfy the quality-of-service criterion, determining, by the user equipment, an uplink traffic delivery mode applicable to at least one multimodal uplink traffic protocol data unit, corresponding to the multimodal downlink traffic protocol data unit, to result in a determined uplink traffic delivery mode ⌐1125 transmitting, by the user equipment to the at least one XR appliance, an uplink traffic delivery mode indication indicative of the determined uplink traffic delivery mode ⌐1130

1100

300

Multi-modal uplink configured grant configurations

| | |
|---|---|
| CG resource occasions and/or resource set information $x_1$ | Restricted to multi-modal downlink-to-uplink traffic: TRUE |
| .. | . . . |
| CG resource occasions and/or resource set information $x_N$ | Restricted to multi-modal downlink-to-uplink traffic: FALSE |

Uplink traffic of XR appliance    945

900

Figure 11:
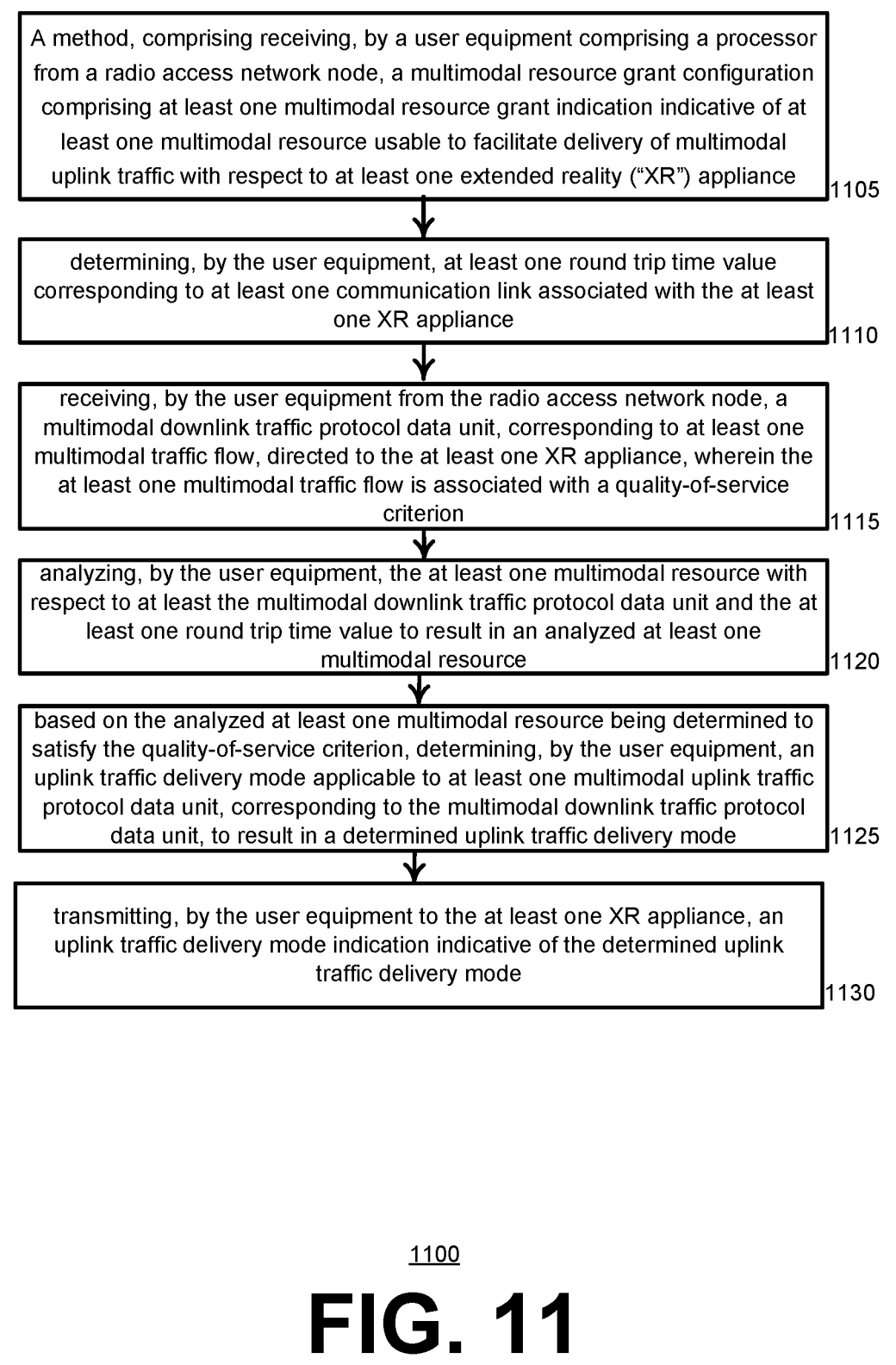

A method, comprising receiving, by a user equipment comprising a processor from a radio access network node, a multimodal resource grant configuration comprising at least one multimodal resource grant indication indicative of at least one multimodal resource usable to facilitate delivery of multimodal uplink traffic with respect to at least one extended reality ("XR") appliance
1105 determining, by the user equipment, at least one round trip time value corresponding to at least one communication link associated with the at least one XR appliance
1110 receiving, by the user equipment from the radio access network node, a multimodal downlink traffic protocol data unit, corresponding to at least one multimodal traffic flow, directed to the at least one XR appliance, wherein the at least one multimodal traffic flow is associated with a quality-of-service criterion
1115 analyzing, by the user equipment, the at least one multimodal resource with respect to at least the multimodal downlink traffic protocol data unit and the at least one round trip time value to result in an analyzed at least one multimodal resource
1120 based on the analyzed at least one multimodal resource being determined to satisfy the quality-of-service criterion, determining, by the user equipment, an uplink traffic delivery mode applicable to at least one multimodal uplink traffic protocol data unit, corresponding to the multimodal downlink traffic protocol data unit, to result in a determined uplink traffic delivery mode
1125 transmitting, by the user equipment to the at least one XR appliance, an uplink traffic delivery mode indication indicative of the determined uplink traffic delivery mode
1130

Figure 12:
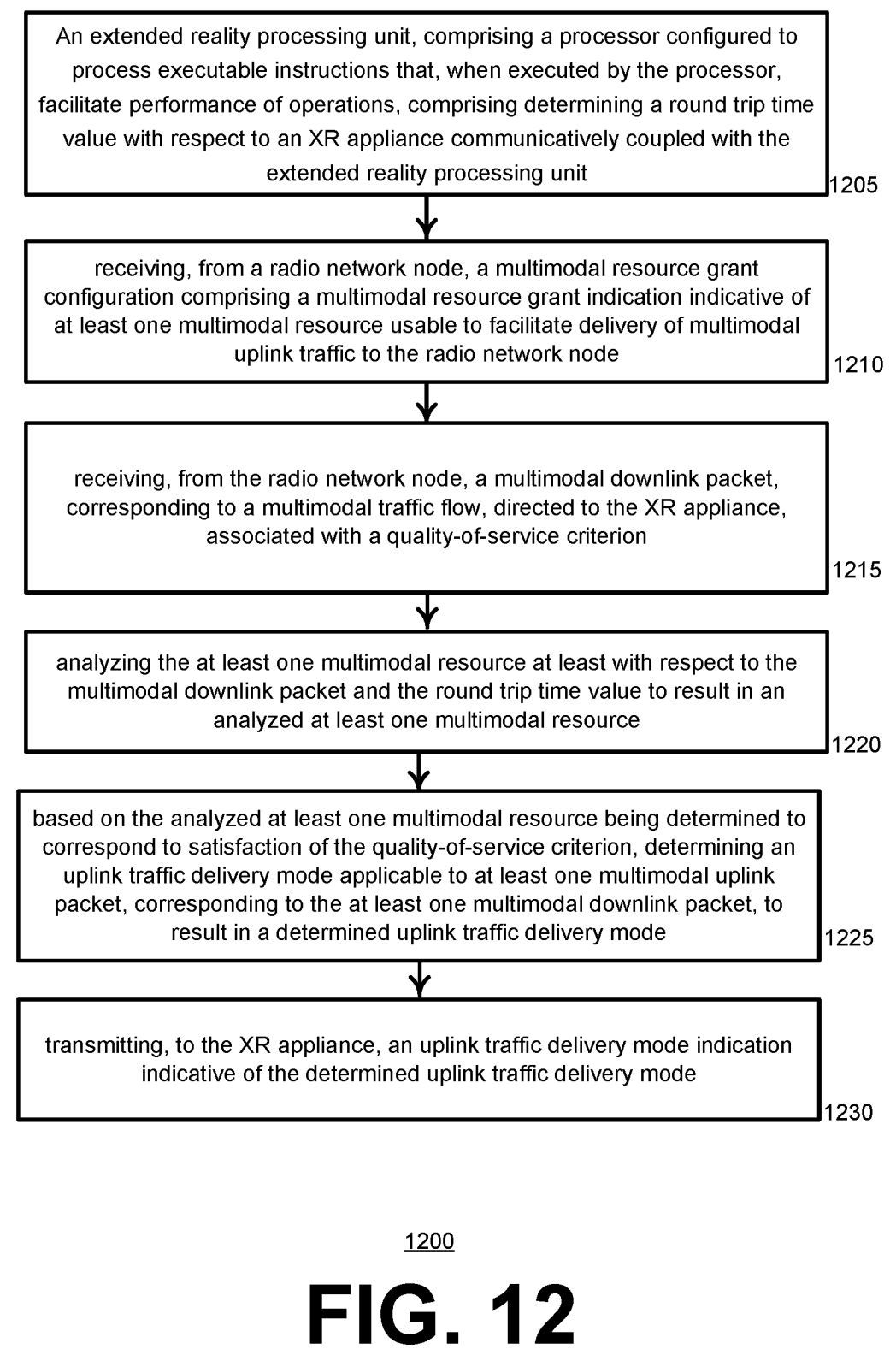

An extended reality processing unit, comprising a processor configured to process executable instructions that, when executed by the processor, facilitate performance of operations, comprising determining a round trip time value with respect to an XR appliance communicatively coupled with the extended reality processing unit

1205 receiving, from a radio network node, a multimodal resource grant configuration comprising a multimodal resource grant indication indicative of at least one multimodal resource usable to facilitate delivery of multimodal uplink traffic to the radio network node

1210 receiving, from the radio network node, a multimodal downlink packet, corresponding to a multimodal traffic flow, directed to the XR appliance, associated with a quality-of-service criterion

1215 analyzing the at least one multimodal resource at least with respect to the multimodal downlink packet and the round trip time value to result in an analyzed at least one multimodal resource

1220 based on the analyzed at least one multimodal resource being determined to correspond to satisfaction of the quality-of-service criterion, determining an uplink traffic delivery mode applicable to at least one multimodal uplink packet, corresponding to the at least one multimodal downlink packet, to result in a determined uplink traffic delivery mode

1225 transmitting, to the XR appliance, an uplink traffic delivery mode indication indicative of the determined uplink traffic delivery mode

Figure 13:
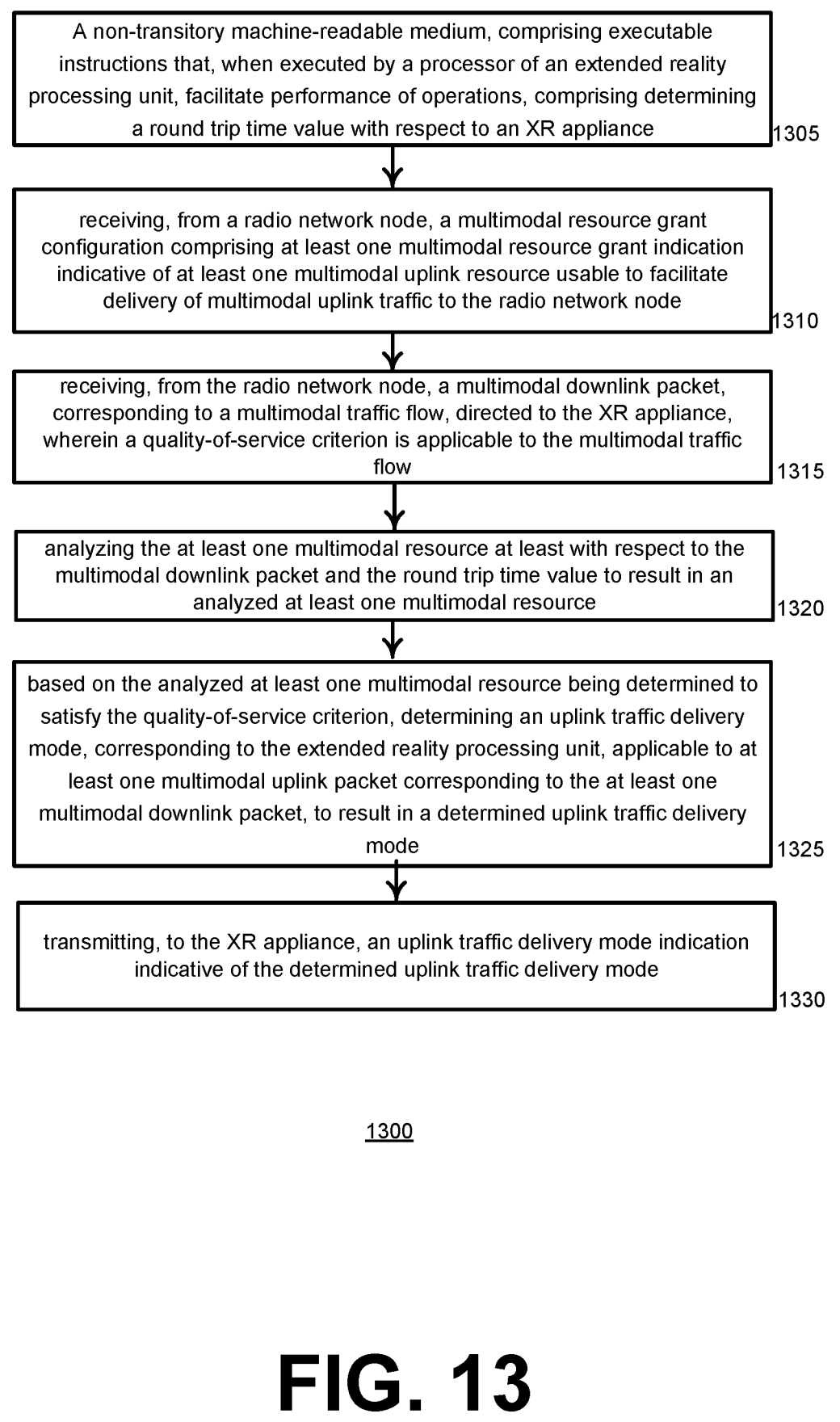

A non-transitory machine-readable medium, comprising executable instructions that, when executed by a processor of an extended reality processing unit, facilitate performance of operations, comprising determining a round trip time value with respect to an XR appliance
1305

↓ receiving, from a radio network node, a multimodal resource grant configuration comprising at least one multimodal resource grant indication indicative of at least one multimodal uplink resource usable to facilitate delivery of multimodal uplink traffic to the radio network node
1310

↓ receiving, from the radio network node, a multimodal downlink packet, corresponding to a multimodal traffic flow, directed to the XR appliance, wherein a quality-of-service criterion is applicable to the multimodal traffic flow
1315

↓ analyzing the at least one multimodal resource at least with respect to the multimodal downlink packet and the round trip time value to result in an analyzed at least one multimodal resource
1320

↓ based on the analyzed at least one multimodal resource being determined to satisfy the quality-of-service criterion, determining an uplink traffic delivery mode, corresponding to the extended reality processing unit, applicable to at least one multimodal uplink packet corresponding to the at least one multimodal downlink packet, to result in a determined uplink traffic delivery mode
1325

↓ transmitting, to the XR appliance, an uplink traffic delivery mode indication indicative of the determined uplink traffic delivery mode
1330

AUTONOMOUS CONFIGURED GRANT SCHEDULING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment comprising a processor from a radio access network node, a multimodal resource grant configuration comprising at least one multimodal resource grant indication indicative of at least one multimodal resource usable to facilitate delivery of multimodal uplink traffic with respect to at least one extended reality ("XR") appliance The method may further comprise determining, by the user equipment, at least one round trip time value corresponding to at least one communication link associated with the at least one XR appliance. The method may comprise receiving, by the user equipment from the radio access network node, a multimodal downlink traffic protocol data unit, corresponding to at least one multimodal traffic flow, directed to the at least one XR appliance, wherein the at least one multimodal traffic flow is associated with a quality-of-service criterion. The method may further comprise analyzing, by the user equipment, the at least one multimodal resource with respect to at least the multimodal downlink traffic protocol data unit and the at least one round trip time value to result in an analyzed at least one multimodal resource and based on the analyzed at least one multimodal resource being determined to satisfy the quality-of-service criterion, determining, by the user equipment, an uplink traffic delivery mode applicable to at least one multimodal uplink traffic protocol data unit, corresponding to the multimodal downlink traffic protocol data unit, to result in a determined uplink traffic delivery mode. The method may further comprise transmitting, by the user equipment to the at least one XR appliance, an uplink traffic delivery mode indication indicative of the determined uplink traffic delivery mode.

In an embodiment, the at least one multimodal resource may comprise a periodicity corresponding to the quality-of-service criterion. In an embodiment, the at least one multimodal resource may comprise a periodicity corresponding to the at least one round trip time value.

The quality-of-service criterion may comprise a multimodal latency corresponding to transmission of the at least one multimodal uplink traffic protocol data unit with respect to the multimodal downlink traffic protocol data unit. The quality-of-service criterion may comprise a maximum allowable latency between receiving of a multimodal downlink traffic packet from the radio access network node and transmitting of a multimodal uplink traffic packet that is generated responsive to the multimodal downlink traffic packet.

The uplink traffic delivery mode indication may be indicative of the determined uplink traffic delivery mode corresponding to delivery of uplink traffic, generated by the at least one XR appliance and directed to the radio access network node, via the user equipment. In this scenario, the determined uplink traffic delivery mode may be referred to as a relay mode and may comprise the user relaying multimodal uplink traffic, generated by the XR appliance, to the radio access network node on behalf of the XR appliance.

In an embodiment, the quality-of-service criterion may comprise a latency, and the analyzing the at least one multimodal resource may comprise determining, by the user equipment, that transmission, via the user equipment, of the at least one multimodal uplink traffic protocol data unit via a next-occurring uplink transmission occasion of the at least one multimodal resource, occurring next with respect to the receiving of the multimodal downlink traffic protocol data unit and at least the at least one round trip time value, satisfies the quality-of-service criterion. (E.g., transmission of the at least one multimodal uplink traffic protocol data unit according to the relay mode may correspond to satisfaction of the quality-of-service criterion.)

In an embodiment, the method may further comprise receiving, by the user equipment from the at least one XR appliance, the at least one multimodal uplink traffic protocol data unit and transmitting, by the user equipment to the radio access network node, the at least one multimodal uplink traffic protocol data unit via the next-occurring uplink transmission occasion of the at least one multimodal resource.

In an embodiment, the uplink traffic delivery mode indication may be indicative of the determined uplink traffic delivery mode corresponding to delivery to the radio access network node of the at least one multimodal uplink traffic protocol data unit, generated by the at least one XR appliance and directed to the radio access network node, directly by the at least one XR appliance. This mode may be referred to as a direct transmission mode and may correspond to direct transmission by the XR appliance of multimodal uplink traffic generated by the XR appliance directly to the radio access network node without the multimodal uplink traffic being relayed by the user equipment. The quality-of-service criterion may comprise a latency, and the analyzing the at least one multimodal resource may comprise determining, by the user equipment, that transmission, by the user equipment, of the at least one multimodal uplink traffic protocol data unit via a next-occurring uplink transmission occasion of the at least one multimodal resource, occurring next with respect to the receiving of the multimodal downlink traffic protocol data unit and at least the at least one round trip time value, fails to satisfy the quality-of-service criterion. (E.g., transmission of the at least one multimodal uplink traffic protocol data unit by the XR processing unit according to the relay mode does not correspond to satisfaction of the quality-of-service criterion but transmission of the at least one multimodal uplink traffic protocol data unit to the radio network node directly by the XR appliance according to the direct transmission mode may correspond to satisfaction of the quality-of-service criterion.)

In an embodiment, the uplink traffic delivery mode indication may be further indicative of the at least one multimodal resource being usable by the at least one XR appliance to facilitate delivery of the at least one multimodal uplink traffic protocol data unit directly to the radio access network node. In an embodiment, the uplink traffic delivery mode indication may be further indicative of the at least one multimodal resource being unusable by the at least one XR appliance to facilitate delivery of the at least one multimodal uplink traffic protocol data unit directly to the radio access network node.

In an embodiment, the method may further comprise transmitting, by the user equipment to the radio access network node, a round trip time report comprising at least one round trip indication indicative of the at least one round trip time value. The at least one round trip time value may be usable by the radio access network node to determine the determined uplink traffic delivery mode and to receive the at least one multimodal uplink traffic protocol data unit according to the determined uplink traffic delivery mode. Thus, the roundtrip time report may facilitate independent determination by the radio access network node of the traffic delivery mode according to which the at least one multimodal uplink traffic protocol data unit, which may be a packet, may be transmitted to the radio access network node, either by the user equipment or by the at least one XR appliance.

In another example embodiment, an extended reality processing unit may comprise a processor configured to process executable instructions that, when executed by the processor, facilitate performance of operations, comprising determining a round trip time value with respect to an XR appliance communicatively coupled with the extended reality processing unit. The operations may further comprise receiving, from a radio network node, a multimodal resource grant configuration comprising a multimodal resource grant indication indicative of at least one multimodal resource usable to facilitate delivery of multimodal uplink traffic to the radio network node. The operations may comprise receiving, from the radio network node, a multimodal downlink packet, corresponding to a multimodal traffic flow, directed to the XR appliance, associated with a quality-of-service criterion. The operations may further comprise analyzing the at least one multimodal resource at least with respect to the multimodal downlink packet and the roundtrip time value to result in an analyzed at least one multimodal resource. Based on the analyzed at least one multimodal resource being determined to correspond to satisfaction of the quality-of-service criterion, the operations may further comprise determining an uplink traffic delivery mode applicable to at least one multimodal uplink packet, corresponding to the at least one multimodal downlink packet, to result in a determined uplink traffic delivery mode. The operations may comprise transmitting, to the XR appliance, an uplink traffic delivery mode indication indicative of the determined uplink traffic delivery mode.

In an embodiment, the uplink traffic delivery mode indication may be indicative of the determined uplink traffic delivery mode corresponding to delivery of uplink traffic, generated by the XR appliance and directed to the radio network node, via the extended reality processing unit. The analyzing the at least one multimodal resource may comprise determining that transmission, via the extended reality processing unit, of the at least one multimodal uplink packet via a next-occurring uplink transmission occasion of the at least one multimodal resource, occurring next with respect to at least the receiving of the multimodal downlink packet and the roundtrip time value, corresponds to satisfaction of the quality-of-service criterion.

In an embodiment, the operations may further comprise responsive to the transmitting of the uplink traffic delivery mode indication, receiving, from the XR appliance, the at least one multimodal uplink packet and transmitting, to the radio network node, the at least one multimodal uplink packet via the next-occurring uplink transmission occasion of the at least one multimodal resource.

In an embodiment, the uplink traffic delivery mode indication may be indicative of the determined uplink traffic delivery mode corresponding to delivery, to the radio network node, of the at least one multimodal uplink packet, generated by the XR appliance and directed to the radio network node, directly by the XR appliance. The analyzing the at least one multimodal resource may comprise determining that transmission, by the extended reality processing unit, of the at least one multimodal uplink packet via a next-occurring uplink transmission occasion of the at least one multimodal resource, occurring next at least with respect to the receiving of the multimodal downlink packet and the round trip time value, corresponds to failure to satisfy the quality-of-service criterion. The uplink traffic delivery mode indication may be further indicative of the at least one multimodal resource being usable by the XR appliance to facilitate delivery of the at least one multimodal uplink packet directly to the radio network node.

In yet another example embodiment, a non-transitory machine-readable medium may comprise executable instructions that, when executed by a processor of an extended reality processing unit, facilitate performance of operations comprising determining a round trip time value with respect to an XR appliance. The operations may further comprise receiving, from a radio network node, a multimodal resource grant configuration comprising at least one multimodal resource grant indication indicative of at least one multimodal uplink resource usable to facilitate delivery of multimodal uplink traffic to the radio network node. The operations may further comprise receiving, from the radio network node, a multimodal downlink packet, corresponding to a multimodal traffic flow, directed to the XR appliance. A quality-of-service criterion may be applicable to the multimodal traffic flow. The operations may further comprise analyzing the at least one multimodal resource at least with respect to the multimodal downlink packet and the roundtrip time value to result in an analyzed at least one multimodal resource. Based on the analyzed at least one multimodal resource being determined to satisfy the quality-of-service criterion, the operations may further comprise determining an uplink traffic delivery mode, corresponding to the extended reality processing unit, applicable to at least one multimodal uplink packet corresponding to the at least one multimodal downlink packet, to result in a determined uplink traffic delivery mode. The operations may comprise transmitting, to the XR appliance, an uplink traffic delivery mode indication indicative of the determined uplink traffic delivery mode.

In an embodiment, the at least one multimodal uplink resource may be usable to transmit multimodal uplink traffic or non-multimodal uplink traffic.

In an embodiment, at least one of the at least one multimodal uplink resource may be usable, by the extended reality processing unit, only to transmit multimodal uplink traffic.

The at least one of the at least one multimodal uplink resource may be a first uplink resource. The operations may further comprise determining that delivery of the at least one multimodal uplink packet is able to be facilitated by a second uplink resource; avoiding facilitating transmission of the at least one multimodal uplink packet using the first uplink resource; and facilitating transmission of the at least one multimodal uplink packet using the second uplink resource. In an embodiment, the first uplink resource may be usable, by the radio network node, to facilitate delivery of traffic other than traffic corresponding to the multimodal traffic flow.

BRIEF DESCRIPTION OF THE DRAWINGS

FIG. 4 illustrates an example multimodal resource grant configuration.

FIG. 11 illustrates a block diagram of an example method embodiment.

FIG. 12 illustrates a block diagram of an example extended reality processing unit.

FIG. 13 illustrates a block diagram of an example non-transitory machine-readable medium embodiment.

DETAILED DESCRIPTION

Figure 1:
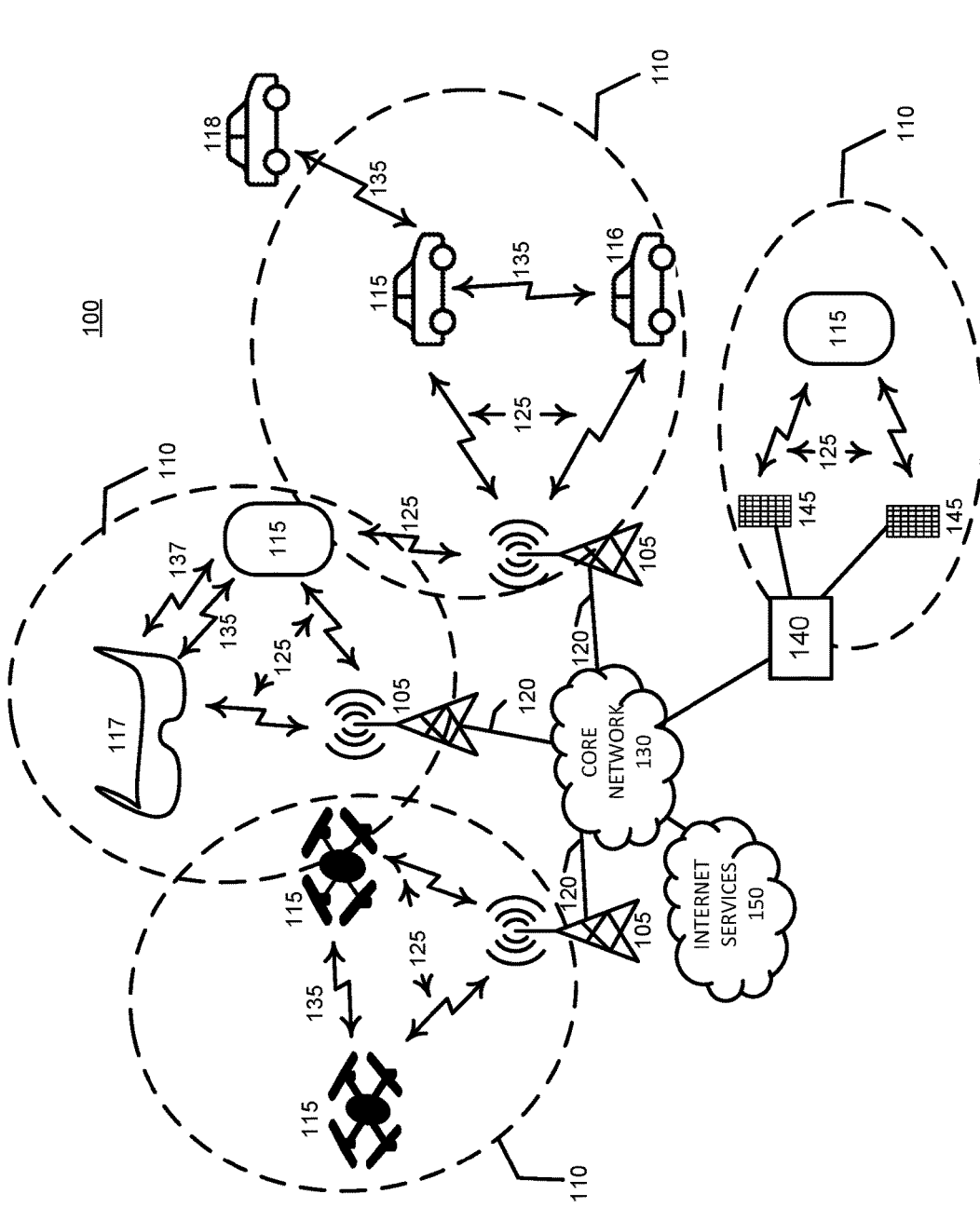
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR service may be referred to as anything reality services. XR services may comprise VR applications, which are widely adopted XR applications that provide an immersive environment that can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 14.

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW)

communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Configured grant scheduling is a type of uplink resource scheduling that facilitates minimizing scheduling latency, which is beneficial for delivery of latency stringent traffic (e.g., traffic packets corresponding to a low latency requirement/criterion). A radio network node may semi-statically configure one or more periodic resource sets or resource occasions for devices to adopt for transmitting latency-stringent uplink traffic arrivals. The configured periodic resource occasions may be referred to as configured grant ("CG") occasions. A CG resource occasion may correspond to assignment, or granting, of certain frequency resources for a certain amount of time that repeat periodically and that are usable for uplink traffic transmission. Accordingly, when a device facilitating latency-critical traffic has latency-critical uplink packet arrivals (e.g., arrived from an application or from another device), the device may immediately transmit the latency-critical packets during one or more next available CG occasions. Using CG resource occasions may facilitate avoiding traffic buffering delay resulting from a device having to first request a scheduling grant with an indication of how much uplink traffic is to be transmitted, receiving a resource grant, and finally transmitting the uplink traffic (e.g., CG scheduling may facilitate avoiding dynamic scheduling).

CG scheduling clearly offers fast transmission of uplink packets with less control overhead. However, since CG scheduling typically involves scheduling of resources at periodic occasions, CG scheduling is more efficient and beneficial when a packet arrival rate at a devices is almost periodic. For example, for to achieve a high network spectral efficiency, a radio network node may align a CG resource occasion periodicity for occasions configured for a given device to align with an expected packet arrival rate at the device, thus maximizing a likelihood that CG resource set occasions are efficiently utilized. Furthermore, a CG resource set or occasion can be dedicated to a single device or may be shared among multiple active devices, wherein each device may be assigned an orthogonal scrambling code or preamble to modulate traffic with respect to a serving network node. Such orthogonal modulation may facilitate multiple devices simultaneously transmitting respective uplink traffic payload simultaneously via the same CG resource occasion and may facilitate the network node being able to distinguish and separately decode the individual traffic streams corresponding to the different transmitting devices.

Figure 2:
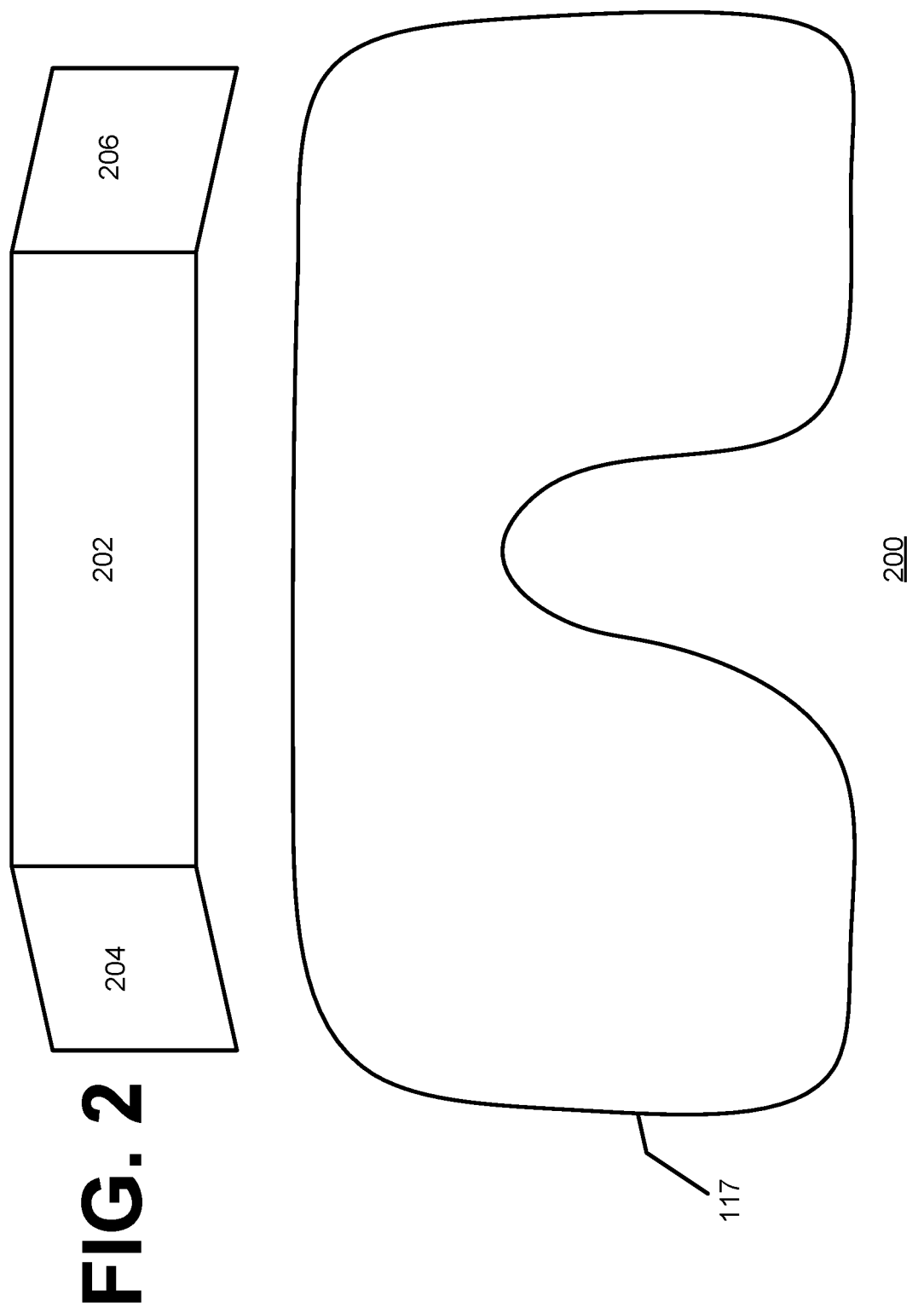
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Multi-modal XR may be used in implementations of XR services. Multi-modal XR services may facilitate diverse use cases beyond XR gaming and XR entertainment services. For example, a multi-modal XR service may facilitate an application class for which multiple downlink-downlink or downlink-uplink traffic streams are correlated, or related, to each other. However, conventional techniques do not facilitate relative QoS enforcement between multiple traffic streams that are related. Instead, related traffic streams/flows are treated independently such that only an independent quality of service criterion corresponding to a given stream/flow may be enforced for the given stream/flow. Independent treatment of related traffic flow may result in sluggish and degraded performance of multi-modal XR applications.

A multi-modal XR application class may comprise applications wherein multiple downlink and/or uplink traffic streams, despite serving different XR viewing, control, or pose purposes, may be highly correlated, or highly related, to each other. Each traffic stream/flow may be associated with one or more independent QoS parameter criterion/ criteria to be satisfied. However, each stream/flow, in reference to another, related, downlink or uplink traffic streams, may have a practical relative, or related, quality of service. For example, a RAN node should schedule for transmission a packet of a downlink traffic flow within a maximum delay criterion from a time when the RAN node receives a packet corresponding to a packet of a related traffic flow (uplink or downlink) to provide an improved user experience. Satisfactory delivery of a packet of a traffic flow (e.g., for purposes of discussion a target traffic flow) may depend on satisfaction of a relative QoS criterion (e.g., a relative delay, a relative reliability, or a relative data rate) with respect to reception or transmission of a packet of a relative traffic flow instead of being only dependent on satisfaction of an independent criterion corresponding to the target flow itself.

For example, for an educational XR application wherein a virtual object pops up in a user's XR appliance field of view when the user looks at or clicks at an associated real/virtual object in the field of view, a relative quality of service ("rQoS") (e.g., a relative tolerable delay budget) should be satisfied between an uplink traffic flow carrying the indication of the user looking or clicking on the real/ virtual object and a respective downlink traffic flow carrying the corresponding virtual object to be popped up. In another example, uplink traffic transmitted by an XR appliance may be related to downlink traffic. In either case, if a delay between the uplink and downlink streams (or vice versa) is large the user experience may be severely impacted.

Multimodal traffic may comprise multiple same-direction and/or multiple cross-direction traffic flows (e.g., downlink traffic flows and uplink traffic flows) that are related to each other such that one or more relative quality of service (QOS) performance target(s)/requirement(s) corresponding to one of the flows must be satisfied to ensure satisfaction of a criterion corresponding to another flow and to deliver a smooth user experience. For example, an uplink traffic packet that is triggered, or generated, at a device based on receiving at the device a packet corresponding to a related multimodal downlink traffic flow, typically must be delivered to the serving RAN node, and thus typically must be scheduled for transmission, within a stringent latency budget with respect to a time when the triggering downlink traffic was received by the device.

Achieving a benefit from even the most latency-accommodative conventional uplink scheduling scheme, (e.g., configured grant ("CG") scheduling) typically depends on pre-allocating uplink resources to match an expected generation of, or availability of, respective uplink traffic that is related to the downlink traffic. However, uplink multimodal traffic typically corresponds to related downlink traffic, which may not be periodic, rather than being based on being independently, predictably, and periodically generated or available for uplink transmission. Accordingly, embodiments disclosed herein may comprise uplink CG scheduling of multimodal uplink traffic that facilitates satisfaction of inter-traffic-flow(s) relative QoS target(s) in a spectrally efficient manner.

In an embodiment, a user equipment may be deployed as an extended reality processing unit and may facilitate communication with a RAN node on behalf of a less capable end XR appliance (e.g., less capable in terms of processing power, battery capacity, transmitter power, or the like). An extended reality processing unit may comprise an 'in-box' processing unit/device that facilitates signaling, traffic handling, and overall radio assistance to an end XR appliance (e.g., helmets, or glasses), which may be capable of communicating directly with a RAN node but with reduced capability. Accordingly, an intermediate XR processing unit (e.g., a laptop or smartphone that is intermediate with respect to communication links between a RAN node and an end XR appliance) may facilitate relaxing a large subset of radio operations, traffic processing, and battery consumption load with respect to an end XR appliance thus leading to a more efficient end XR device design (e.g., requiring less battery size, dissipating less heat, etc.). However, for multimodal traffic wherein uplink traffic responsive to a downlink traffic packet must be delivered to a serving RAN node within a certain pre-determined latency budget, which may be referred to as an inter-traffic relative quality-of-service (rQoS) that is based on a time a downlink traffic packet is received from a RAN node, improvements with respect to conventional uplink scheduling procedures are desirable. Use of 'QoS' herein may refer to 'rQoS'.

Autonomous Configured Grant Scheduling.

According to embodiments disclosed herein, an extended reality processing unit may use rQoS criterion/criteria corresponding to multimodal traffic to facilitate scheduling of uplink CG resource occasions to satisfy the rQoS requirements. A set of CG resource occasions may be defined by a serving RAN node and provided to an XR processing unit to carry potential available multimodal uplink traffic. However, utilization of the CG resource occasions, which may be referred to as activation of the resources, may depend on target multimodal inter-downlink-uplink traffic latency requirements corresponding to a multimodal traffic flow.

In an example, the XR processing unit may determine a maximum round trip time ("RTT") value to exchange a bidirectional traffic unit with an active end XR appliance and may compile and transmit an inter-device RTT report, comprising the maximum RTT value, towards a serving RAN node. The XR appliance may receive a subsequent CG resource grant configuration, from the RAN node, indicating one or more granted CG uplink resource occasions, and one or more binary indications to indicate whether each of the CG resource(s)/occasion(s) can carry general uplink traffic (including first time uplink traffic) or only traffic corresponding to uplink traffic flows that are generated in response to receiving downlink traffic flow (e.g., the downlink traffic corresponds to a multimodal traffic session), and for which an rQoS requirements may be satisfied if transmitted via any of the CG resource occasions indicated in the resource grant configuration. The one or more granted CG uplink resource occasions indicated in a CG resource grant configuration may be determined by the RAN node based on the RTT value. Thus, upon receiving a downlink traffic flow packet, directed to an end XR appliance, that may trigger a relative uplink traffic packet, the intermediate XR processing unit may determine whether the XR processing unit or the end XR appliance is to transmit the uplink traffic based on an analysis of the determined inter-device RTT, available CG occasions for carrying the multimodal uplink traffic, and the target maximum allowable downlink-to-uplink traffic delay/ latency (e.g., a QoS criterion).

Embodiments disclosed herein may facilitate several benefits with respect to conventional techniques. Offloading delivery of traffic with respect to a RAN node from being facilitate directly by an end XR appliance to being facilitate by an intermediate XR processing unit may result in improvement in energy and processing loading at the lower-capability end XR appliance devices, yet the end XR appliance may facilitate delivery with the RAN node of multimodal traffic directly that has a stringent delay budget/QoS criterion. Facilitating, by an XR processing unit, delivery with respect to a RAN node of traffic corresponding to an end XR appliance may result in maximizing network uplink spectral efficiency by avoiding over-allocating and pre-reserving, by a RAN node, of uplink CG resources for non-frequent multimodal uplink traffic. Coordinating and using knowledge/information corresponding to inter-device maximum RTT values and multimodal inter-traffic QoS latency requirements may facilitate a RAN node and an intermediate XR processing unit independently, or autonomously, determining whether activation of a certain CG resource occasion from a configured list of pre-configured occasions may satisfy a relative latency target/QoS criterion corresponding to multimodal traffic. If a determination is made not to facilitate delivery of multimodal traffic via a configured resource occasion that is configured only to carry uplink multimodal traffic flows, the RAN node may be able to re-schedule the CG resources to other available traffic/devices, thus optimizing uplink capacity while still supporting multimodal downlink-to-uplink relative QoS latency targets/criteria.

According to conventional techniques, configured grant resources can be activated in either two ways: (1) being always activated after being granted or (2) being pre-granted but activated by explicit downlink signaling. Embodiments disclosed herein may facilitate implicit activation of CG resource occasions, by independent determination at both a serving RAN node and an XR processing unit whether a configured CG occasion corresponds to satisfaction of a target multimodal latency/delay budget.

According to conventional techniques, generated uplink traffic available at a device buffer can be either always transmitted by the original/generating device itself, or always relayed by an intermediate wireless relay device, based on semi-static grant configurations. In contrast, embodiments disclosed herein may facilitate dynamic selection of a transmission point (e.g., an XR processing unit or a device originating uplink traffic), wherein the relay device (e.g., the XR processing unit) may dynamically determine whether to relay uplink traffic on behalf of an end XR appliance or to temporarily disable traffic relaying, depending on which mode may satisfy a rQoS delay budget corresponding to a multimodal traffic flow based on a RTT delay via communication links between the XR processing unit and the end XR appliance. Embodiments disclosed herein may comprise novel RAN-to-device and device-to-device signaling procedures and information elements.

Figure 3:
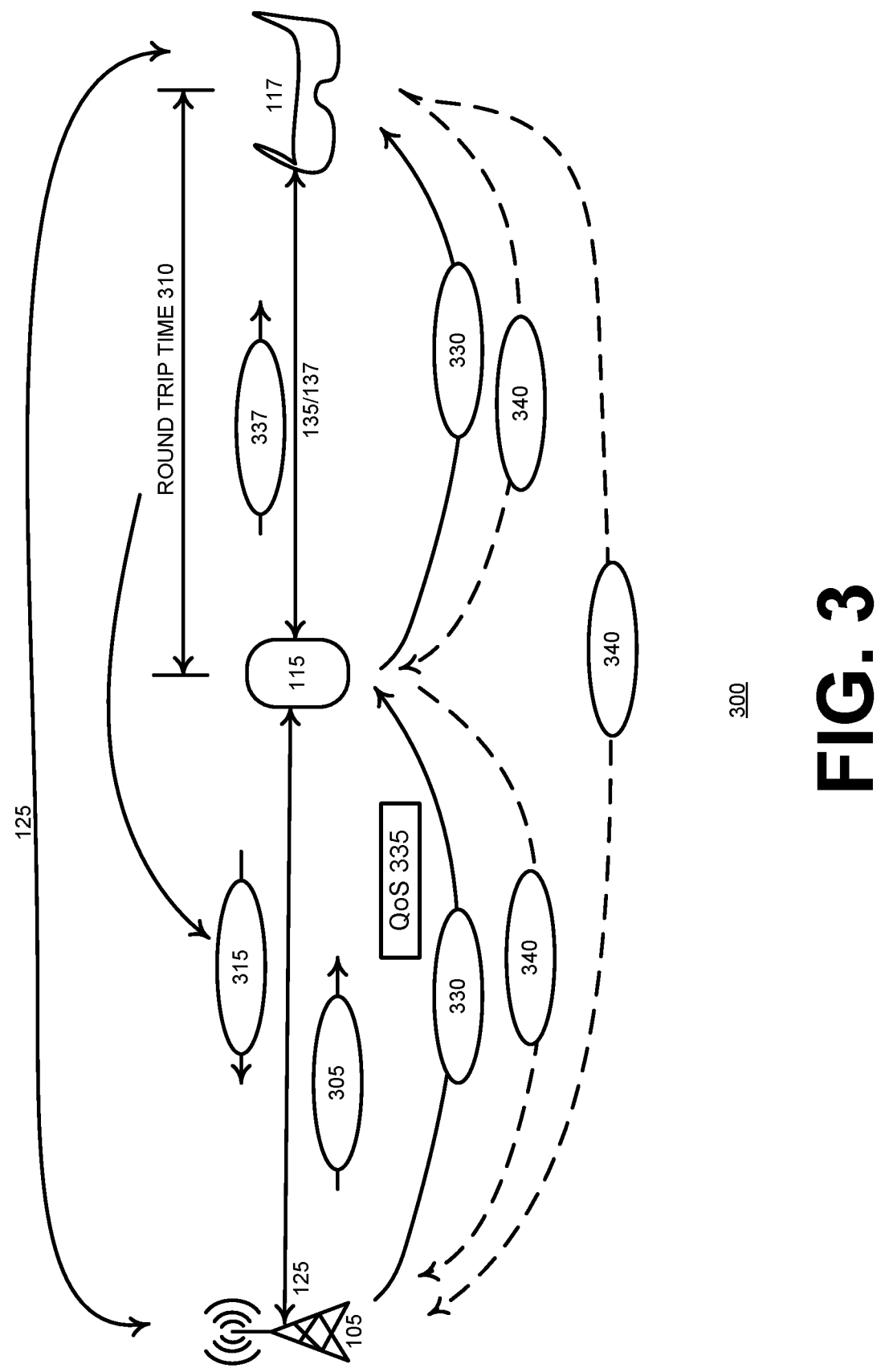
FIG. 3 illustrates an example environment with an anything reality appliance tethered to a user equipment managing related traffic flows with the appliance.

Turning now to FIG. 3, the figure illustrates an example environment 300 with an extended reality appliance 117 tethered to a user equipment 115. Appliance 117 may be referred to as an end XR appliance in reference to the relationship of being at an end of a communication session, with respect to RAN node 105, with extended reality appliance 115 being located intermediate to the RAN node and the appliance. XR processing unit 115 may be more capable with respect to battery capacity (or may be supplied power via a wired power supply receiving power from an electrical wall outlet) or processing capability than XR appliance 117. In an embodiment, a downlink traffic flow providing traffic to a peripheral portion 204/206 (shown in FIG. 2) of VR/XR appliance 117 may be related to a downlink traffic flow carrying traffic to be displayed by a pose portion 202 of the appliance. In another example, two different traffic flows may respectively carry traffic directed to right side 202R and left side 202L of pose portion 202 and thus may be related. In another example, an uplink traffic flow may carry traffic related to a downlink traffic flow. The related traffic flows may be parts of a multimodal traffic flow. XR processing unit 115 may receive a multimodal resource grant configuration 305 comprising at least one multimodal resource grant indication indicative of at least one multimodal resource usable to facilitate delivery of multimodal uplink traffic with respect to extended reality appliance 117.

Configuration 305 may comprise a list of one or more configured grant uplink resource sets or occasions, which may not have been activated, and corresponding binary indications {true, false} indicative of whether resource set occasions associated with the binary indication in configuration 305 is restricted to only carrying multimodal uplink traffic flows (e.g., the binary indication is 'true') or can be used to carry generic uplink traffic (e.g., a 'false' indication may be indicative of being usable for first time traffic or being usable for independent uplink traffic flows). Information contained in configuration 305 may be indicative that certain CG resource sets or resource set occasions can be used for carrying stringent multimodal uplink traffic if a multimodal delay deadline for scheduling and transmission of the traffic is soon to be violated. Thus, both the RAN node that sends to UE/processing unit 115 and processing device 115 implicitly (e.g., without direct signaling between the processing unit and the RAN node to activate a given CG resource ser occasion), and independently, may activate certain multimodal CG occasions to transmit available uplink traffic flows, generated by appliance 117 responsive to receiving traffic corresponding to a multimodal downlink traffic flow. Nonactivated/unused/CG resource set occasions not scheduled for multimodal uplink traffic may be dynamically re-scheduled by the RAN node for other uses, thus avoiding 'locking up' of resources due to pre-reservation or pre-allocation of the resources. For an inter-device link 135/137 between processing unit 115 and appliance 117, the processing unit may determine a maximum experienced round trip time value 310, based on inter-device traffic and control exchanges between the processing unit and appliance during a configured round trip time measurement period.

XR processing unit 115 may compile, generate, or otherwise determine RTT feedback report 315, which may be referred to as a round trip time report, comprising a round trip indication indicative of roundtrip time value 310, and may transmit the roundtrip time report towards serving RAN node 105. On condition of processing unit 115 receiving a packet corresponding to multimodal downlink traffic flow 330, directed to one or more end XR appliances 117, that may cause the appliance to generate an uplink traffic packet corresponding to multimodal uplink traffic flow 340, related to the downlink flow, for transmission to RAN node 105 within a relative determined delay budget, the processing unit may determine an uplink traffic delivery mode applicable to the uplink traffic packet (multimodal traffic may comprise a packet or other type of protocol data unit depending on a type of communication session/protocol being used for the multimodal traffic). The uplink traffic delivery mode may correspond to a best transmission entity mode to transmit the multimodal uplink packet from end XR appliance 117 to RAN node 105, either indirectly via XR processing unit 115 or directly from the end XR appliance, based on which transmission mode, or option, satisfies rQoS requirement 335 corresponding to the multimodal traffic flow. An example of rQoS requirement 335 may be a relative maximum latency budget that may be applicable to a time difference between receiving a downlink traffic packet and transmission of an uplink packet related to the downlink packet.

XR processing unit 115 may calculate and determine a remaining-delay-budget value (e.g., how much time remains of a delay budget after receiving a multimodal downlink traffic packet, corresponding to flow 330, to transmit an uplink packet related to the downlink packet). A first remaining-delay-budget value calculated by XR processing unit 115 may be referred to as relayed-packet remaining-delay-budget value and may correspond to transmission of an uplink packet, related to a received downlink packet, by the XR processing unit on behalf of end XR appliance 117. A relayed-packet remaining-delay-budget value may be calculated based on a difference between a maximum allowable multimodal delay budget and a sum of: a full roundtrip time via a link between processing unit 115 and appliance 117, traffic processing and preparation delay by the processing unit, and buffering delay at the processing unit while waiting until an occurrence of a first available CG resource occasion (e.g., next occasion) that is configured to support carrying multimodal uplink traffic. A second remaining-delay-budget value calculated by XR processing unit 115 may be referred to as direct-transmission remaining-delay-budget value and may correspond to direct transmission of an uplink packet, related to a received downlink packet, by end XR appliance 117. A direct-transmission remaining-delay-budget value may be calculated based on a difference between a maximum allowable multimodal delay budget and a sum of a portion of an inter-device link RTT to transmit a direct uplink traffic indication by processing unit 115 to appliance 117 (e.g., the portion may be, for example, half of a round trip time via a link between the processing unit and the XR appliance) and buffering delay at the processing unit while waiting until an occurrence of a first available CG resource occasion that is configured to support carrying multimodal uplink traffic.

If processing unit 115 determines a remaining-delay-budget value that is zero or that is a positive value if a packet corresponding to traffic flow 340 is transmitted as traffic 340A to the processing unit and then as traffic 340B to RAN node 105, the processing unit may transmit an indirect uplink traffic offloading request 337 towards end XR appliance 117. Request 337 may be referred to as an uplink traffic delivery mode indication and may be indicative of a determined uplink traffic delivery mode wherein XR appliance 117 is to transmit to XR processing unit 115 traffic 340A for relaying to RAN node 105 by the XR processing unit. XR processing unit 115 may receive one or more packet(s) of uplink traffic flow packet 340A corresponding to the received multimodal downlink traffic 330 via inter-device links 135/137, consuming the full link RTT to transmit, and may transmit the received packets corresponding to the uplink traffic (shown as traffic 340B) towards the serving RAN node over a first available CG resource occasion which is configured to support carrying multimodal uplink traffic. It will be appreciated that traffic 340A and traffic 340B may comprise the same one or more packets—the designations 340A and 340B are used to show transmission of traffic 340 via a link 135/137 and link 125, respectively.

If XR processing unit 115 determines a remaining-delay-budget value that is a negative value if a packet corresponding to traffic flow 340 is transmitted as traffic 340A to the processing unit and then as traffic 340B to RAN node 105, but that a remaining-delay-budget is zero or a positive if traffic 340 is transmitted directly by appliance 117 to the RAN node, the XR processing unit may transmit an uplink traffic delivery mode indication 337 indicative of a determined uplink traffic delivery mode wherein end XR appliance 117 is to transmit directly to the RAN node uplink traffic 340 related to downlink traffic 330. Upon receiving an uplink traffic delivery mode indication 337 indicative that end XR appliance 117 is to transmit uplink traffic 340 directly to serving RAN node 105, the end XR appliance may initiate a direct uplink transmission of the available multimodal uplink traffic 340 towards the serving RAN node. Thus, processing unit 115 may determine a best transmission mode for transmitting the uplink traffic packet corresponding to traffic 340, whether indirectly via the processing unit itself or directly by end XR appliance 117, based on which transmission mode, or option, satisfies a relative maximum latency budget requirement 335 applicable to receiving downlink traffic and then transmitting uplink traffic related to the downlink traffic. Because RAN node 105 is configured, via report 315, with round trip time 310, the RAN node can also determine, independently or autonomously with respect to XR processing unit 115, the best transmission mode of a packet corresponding to traffic 340 that satisfies requirement 335, thus 'anticipating' the transmission mode that the XR processing unit may indicate to appliance 117, without messages being transmitted back and forth between the RAN node and the processing unit or the XR appliance. Accordingly, traffic multimodality, and a relative downlink-to-uplink QoS criterion corresponding thereto, is facilitated with uplink grant scheduling while maximizing overall uplink capacity of link 125, whether between RAN node 105 and XR processing unit 115 or between the RAN node and end XR appliance 117, and while avoiding uplink resource pre-allocation of grants reserved only for use by appliance 117.

Turning now to FIG. 4, the figure illustrates an example multimodal resource grant configuration 305. An extended reality processing unit may receive configuration 305 comprising a list of one or more pre-allocated (but not yet activated) configured grant uplink resource sets or occasions 405, and corresponding binary indications 410 (e.g., {true, false}) that may be indicative of whether the respective CG occasions 405 are restricted to carrying only multimodal uplink traffic flows (e.g., if a value in field 410 is indicative of 'true' for a resource indicated in field 405) or is usable for generic uplink traffic (e.g., usable for first time and/or independent uplink traffic flows). An indication in configuration 305 that a resource 405 is restricted only to multimodal traffic, (e.g., a CG resource indicated as only usable for multimodal traffic) may facilitate use of the indicated resource for carrying stringent multimodal uplink traffic if a multimodal delay deadline for scheduling and transmission of the uplink traffic is approaching (e.g., if a multimodal QOS criterion, such as a latency criterion, will likely be violated if the resource is not used to transmit the multimodal uplink traffic). Accordingly, both the RAN node and extended reality processing unit implicitly, without additional activation/signaling, independently 'assume' activation of certain multimodal CG occasions by the other to transmit available uplink traffic that may be triggered by receiving a respective/related downlink traffic. Resources 405 corresponding to a CG occasion, or occasions, indicated as 'true' in field 410 that is/are not activated (e.g., is not used to satisfy a multimodal QoS criterion) may be re-scheduled by the RAN node for another use, thus avoiding wasting of the resource(s) that would otherwise result from conventional resource pre-reservation/pre-allocation.

Figure 5:
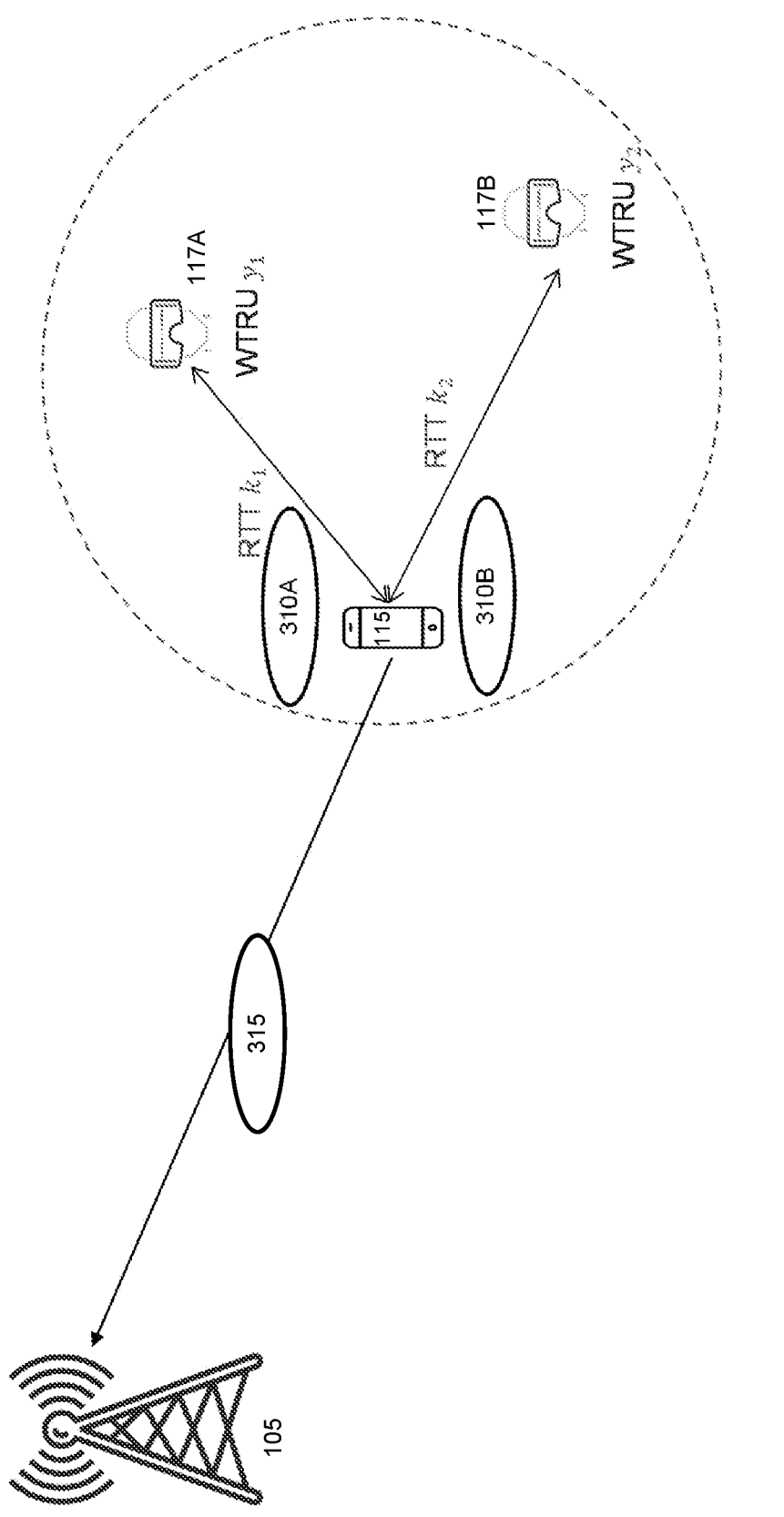
FIG. 5 illustrates an environment with a user equipment determining, and reporting to a radio network node, a round trip time report.

For each of one or more inter-device links between an XR processing unit and one or more active end XR appliance(s)

communicatively coupled to the XR processing unit via the link(s), the processing unit may determine a maximum experienced round trip time based on inter-device traffic and control exchanges during a measurement period. Turning now to FIG. 5, the figure illustrates environment 500. User equipment 115, which may be, or which may comprise, an extended reality processing unit, may determine round trip time indications 310A and 310B corresponding to end XR appliances 117A and 117B, respectively. Round trip time indications 310A and 310B may be, or may be indicative of, round trip time values RTT $k_1$ and RTT $k_2$ corresponding to end XR appliances 117A and 117B, respectively. UE/extended reality processing unit 115 may report round trip time indications 310A or 310B to radio access network node 105 via a round trip time report 315. Radio access network node 105 may use round trip time values indicated in, or contained in, round trip time report 315 to determine a transmission mode that extended reality processing unit 115 may also determine to indicate to at least one of end XR appliance 117A or 117B how as a mode for transmission of multimodal uplink traffic responsive to the extended reality processing unit receiving multimodal downlink traffic from the radio access network node. Thus, instead of radio network node 105 consuming resources to indicate to either extended processing unit 115 or at least one of end XR appliances 117A or 117B uplink resources to activate and use to transmit multimodal uplink traffic that corresponds to, is related to, or is responsive to, multimodal downlink traffic, the radio network node and the extended reality processing unit may use previously determined round trip time values, corresponding to one or more communication times between the extended reality processing unit and at least one of end XR appliance 117A and 117B, to independently and locally determine whether at least one of end XR appliances 117A or 117B may transmit to radio network node 105 the multimodal uplink traffic directly or via the extended reality processing unit.

Figure 6:
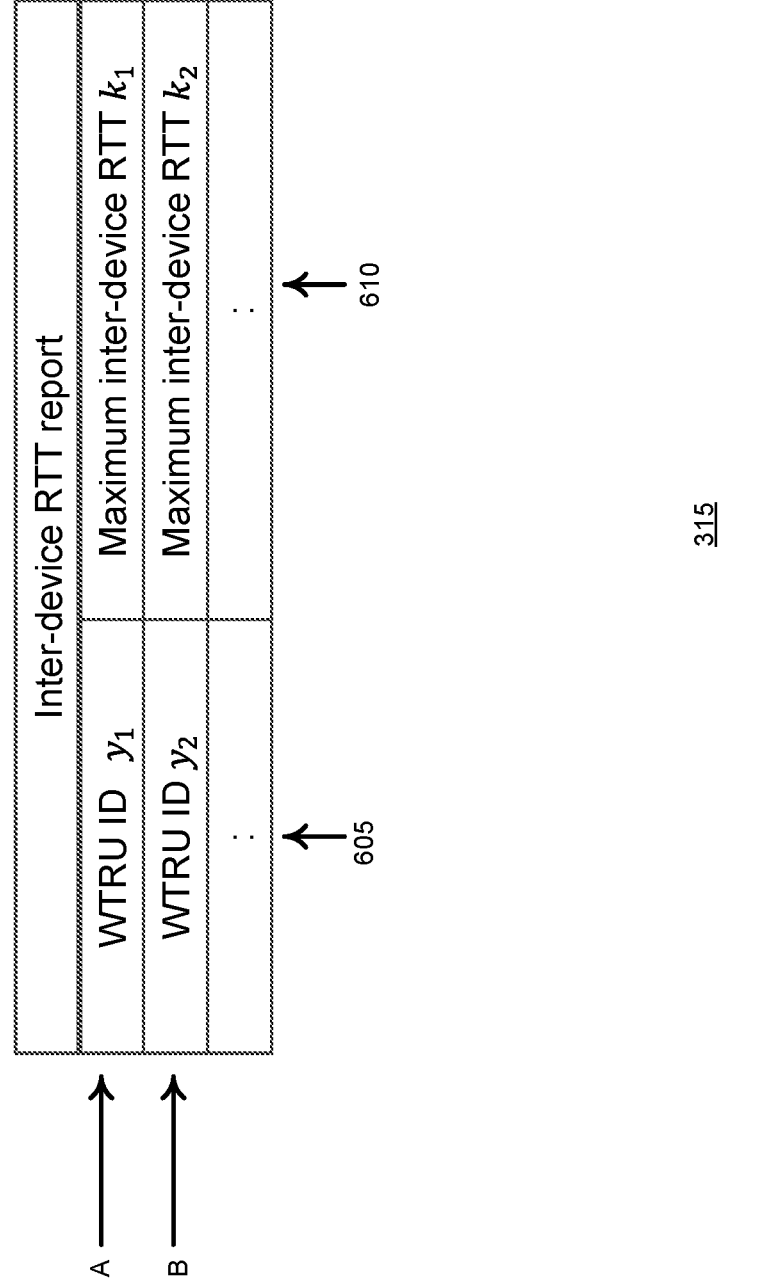
FIG. 6 illustrates an example round trip time report.

Turning now FIG. 6, the figure illustrates an example round trip time report 315. Report 315 may comprise an identifier corresponding to a first end XR appliance in field 605A or a second and XR appliance in field 605B. Field 610A may comprise a round trip time value corresponding to an amount of time for a signal, message, or traffic unit to travel from an XR processing unit to an XR appliance indicated in field 605A and for a signal to travel from the XR appliance to the XR processing unit. Field 610B may comprise a round trip time value corresponding to an amount of time for a signal to travel from an XR processing unit to an XR appliance indicated in field 605B and for a signal to travel from the XR appliance to the XR processing unit.

Figure 7:
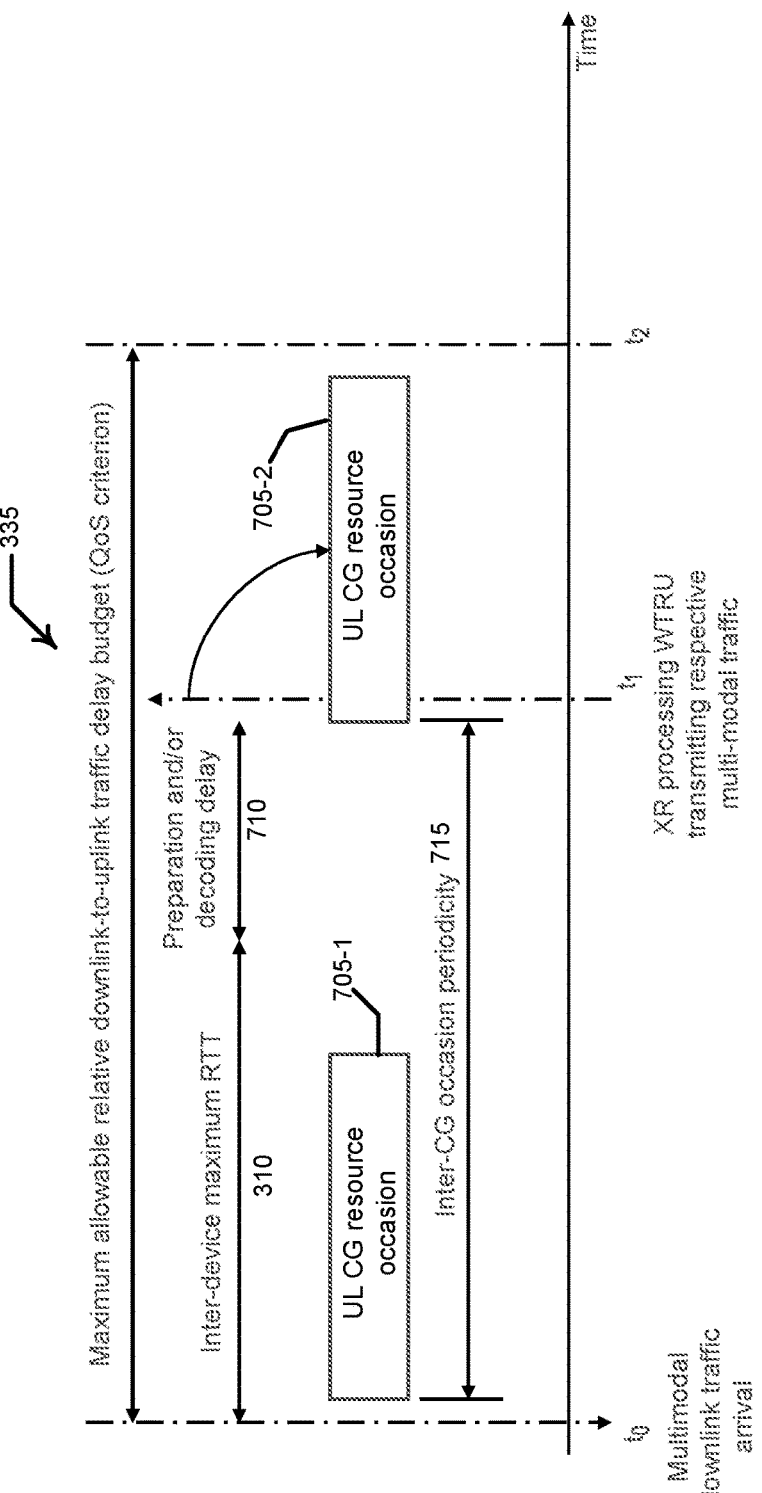
FIG. 7 illustrates an example embodiment of determining relaying multimodal uplink traffic to a radio network node via an extended reality processing unit.

Turning now to FIG. 7, the figure illustrates an example embodiment of determining relaying of multimodal uplink traffic to a radio network node via an extended reality processing unit. As shown in FIG. 7, and in reference to FIG. 3 and the description thereof, on condition of determining a zero or positive value remaining-delay-budget value corresponding to transmission, via resource occasion 705-2 configured via configuration 305, at $t_1$ of multimodal uplink traffic related to a downlink traffic packet received from a serving RAN node at to, an XR processing unit may transmit an uplink traffic delivery mode indication 337 to an end XR appliance to which the downlink packet is directed. The zero or positive-value remaining-delay-budget value may correspond to transmission, by the XR processing unit of an uplink packet at time $t_1$ corresponding to satisfaction of rQoS criterion/delay budget 335. Indication 337 may indicate that uplink traffic, related to the downlink traffic, generated by the end XR appliance is to be relayed to the RAN node by the XR processing unit. Responsive to transmitting indication 337 indicating a transmission mode that comprises relaying of the uplink traffic by the XR processing unit, the XR processing unit may receive an uplink traffic packet via a link between the XR processing unit and the end XR appliance. The XR processing unit may transmit the received uplink traffic packet toward the serving RAN node via next available CG resource occasion 705-2, which may be configured to support carrying multimodal uplink traffic. It will be appreciated that periodicity 715 corresponding to configured uplink configured grant resource occasions 705-1 and 705-2 may be based on QoS criterion 335 or RTT 310.

Figure 8:
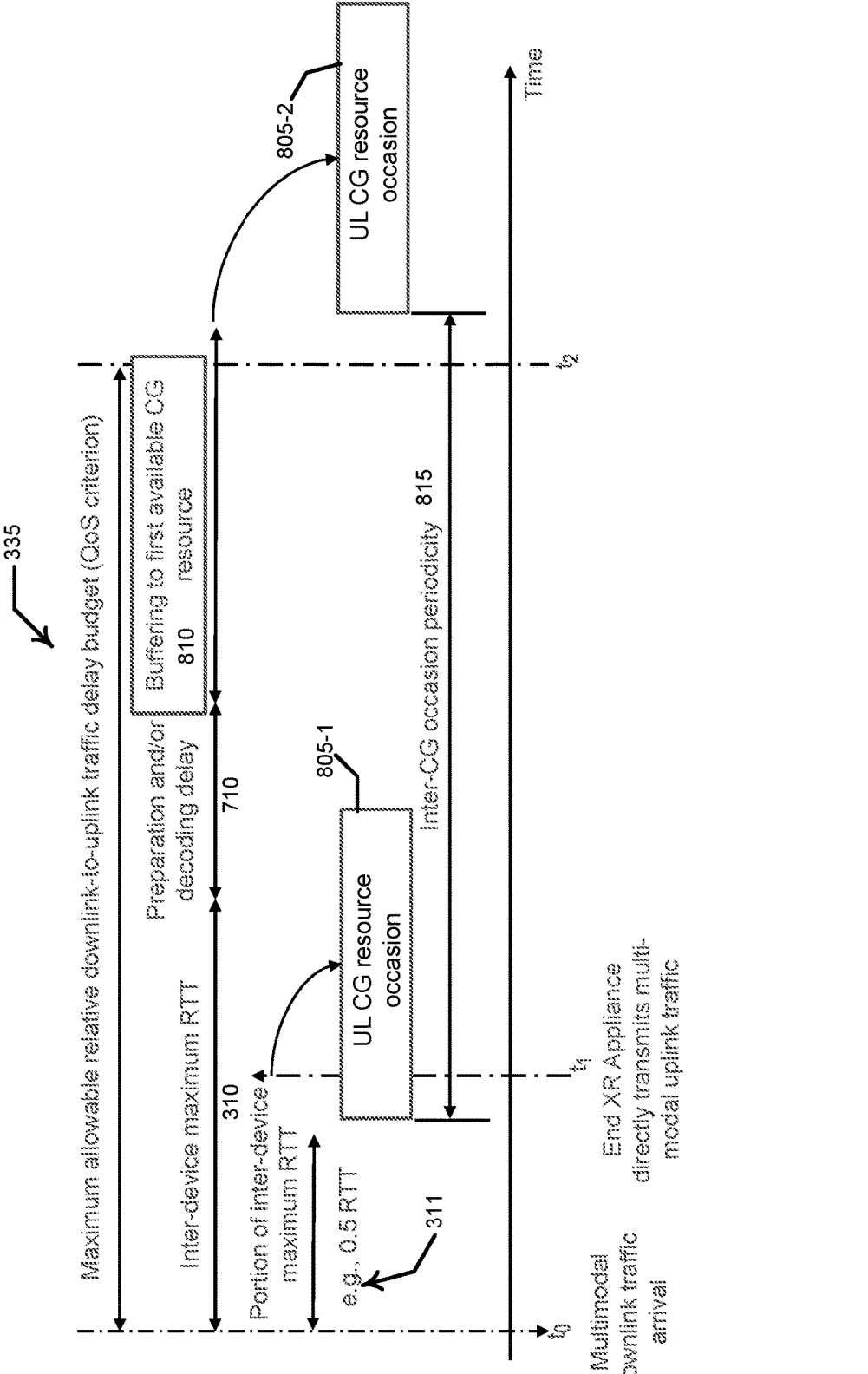
FIG. 8 illustrates an example embodiment of determining direct transmission of multimodal uplink traffic to a radio network node by an end extended reality appliance.

Turning now to FIG. 8, the figure illustrates an example embodiment of determining direct transmission of multimodal uplink traffic to a radio network node by an end extended reality appliance. As shown in FIG. 8, and in reference to FIG. 3 and description thereof, on condition of determining a negative value remaining delay budget value if uplink traffic from an end XR appliance is relayed to a serving RAN node via an XR processing unit, but a positive or zero value remaining-delay-budget value corresponds to the uplink traffic from the end XR appliance being transmitted to the RAN node directly by the end XR appliance, the XR processing unit may transmit an uplink traffic delivery mode indication 337 to the end XR appliance indicating direct transmission of the uplink traffic by the end XR appliance to the RAN node. An XR processing unit may receive a downlink packet corresponding to a multimodal traffic flow at time $T_0$. Based on round trip time 310 between the end XR appliance and the XR processing, potential preparation or decoding delay 710 at the XR processing unit, or an amount of buffering time 810 until a second, or next, uplink configured grant resource occasion 805-2 (wherein uplink configured grant resource location 805-1 is a first uplink configure grant resource occasion), maximum delay budget 335 expires at time $t_2$ with respect to time $t_0$. Based on periodicity 815, second uplink configured grant resource location 805-2 doesn't begin until after time $t_2$. Thus, delay budget 335 cannot be satisfied by transmission, by the XR processing unit, of an uplink packet, corresponding to a downlink packet received at time $t_0$, via uplink configure grant resource occasion 805-2. However, satisfaction of delay budget 335 may be satisfied by direct transmission, by the end XR appliance to which the downlink traffic received at to is directed, at time $t_1$, of an uplink packet, corresponding to a downlink packet received at time $t_0$, via uplink configured grant resource occasion 805-1. Accordingly, because time $t_1$, which in reference to time $t_0$ is based on time $t_0$ transmit the downlink packet received at time $t_0$ to the XR appliance, or approximately half of the round trip time 310 between XR processing unit and the end XR appliance, plus some additional decoding or processing time at the end XR appliance, occurs during first uplink configured grant resource occasion 805-1, the XR processing unit appliance can transmit a packet received at time $t_0$ and uplink traffic delivery mode indication 337 to the end XR appliance and the end XR appliance can generate an uplink packet responsive to the downlink traffic received time $t_0$, and because time $t_1$ occurs during first uplink configure grant resource 805-1, responsive to indication 337 the end XR appliance can directly transmit an uplink packet to the serving RAN node using uplink configured grant resource occasion 801-1 before time $t_2$, thus satisfying traffic delay budget 335. Because the serving RAN node is configured via a round trip report 315 with the roundtrip time value 310 in field 605 of report 315 corresponding to the XR processing unit and the end XR appliance, the RAN node may anticipate transmission of a multimodal uplink packet corresponding to the multimodal downlink packet received at time $t_0$, according to uplink configured grant resource occasion 805-1. The RAN node may release, or use for another purpose, second uplink configured grant resource occasion 805-2 based on configured grant resource occasions 805-1 and 805-2 being indicated in a multimodal resource grant configuration 305 as 'true' or restricted for multimodal downlink-to-uplink traffic.

Figure 9:
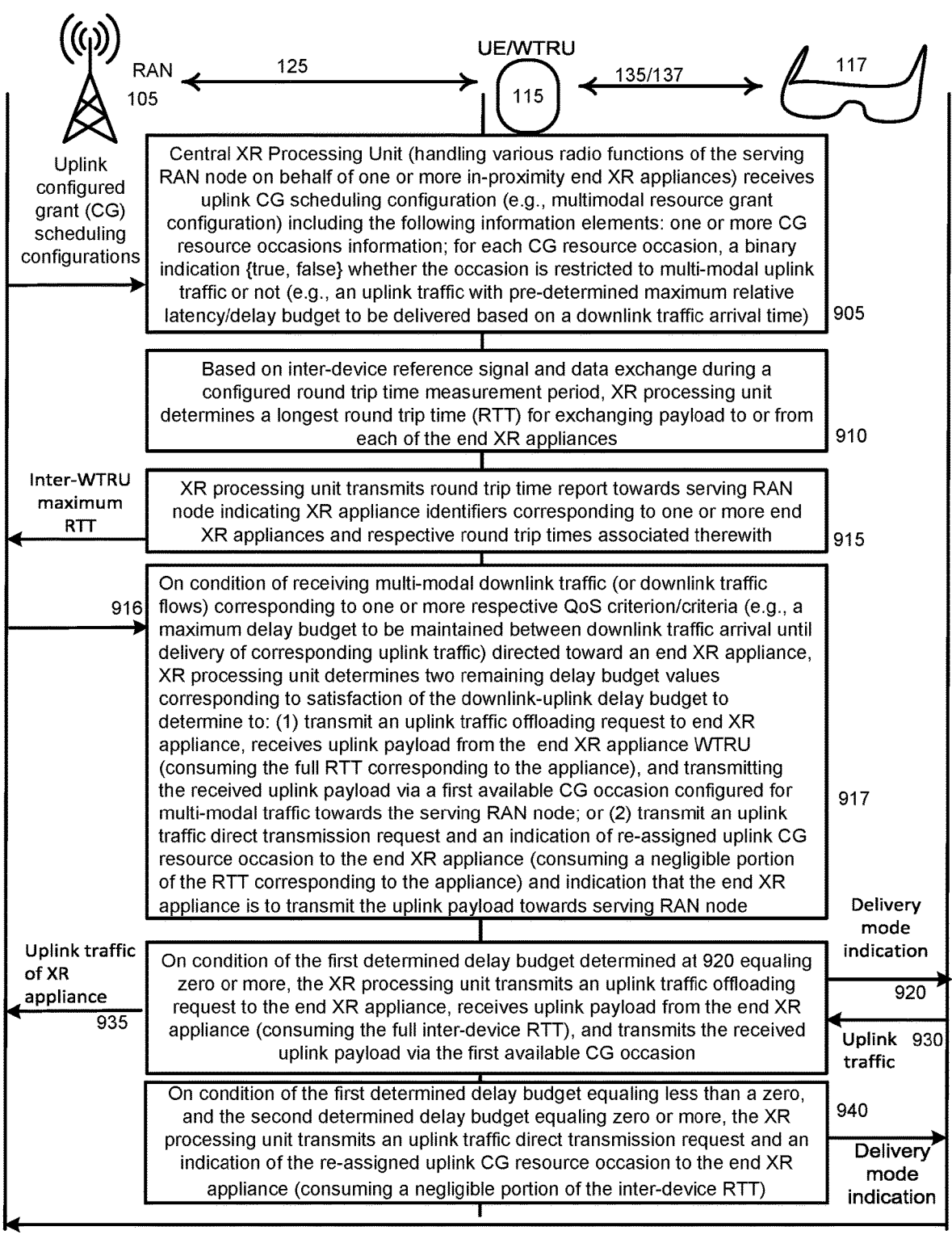
FIG. 9 illustrates timing diagram of an example embodiment of uplink traffic being transmitted to a radio access network node according to autonomously granted uplink resources.

Turning now to FIG. 9, the figure illustrates a timing diagram of an example embodiment method 900 to facilitate transmitting uplink traffic, related to downlink traffic, corresponding to end XR appliance 117. At act 905, central XR processing unit/WTRU 115, which may be configured to handle, manage, or otherwise facilitation, various radio functions, typically corresponding to a serving RAN node, with respect to one or more in-proximity end XR appliances/WTRUs 117, may receive an uplink configured grant scheduling configuration, which may be referred to as a multimodal resource grant configuration. A multimodal resource grant configuration may comprise information indicative of one or more CG resource occasions. For each CG resource occasion, a binary indication {true, false} may be included indicative of whether the respective CG occasion is restricted to use with respect to multi-modal uplink traffic or not (e.g., traffic flows wherein an uplink traffic packet is to be delivered within a pre-determined maximum latency/delay budget relative to an arrival time of a related multimodal downlink packet). At act 910, based on inter-device reference signal and data exchange during a measurement period that may be configured by RAN node 105, central XR processing unit 115 may determine a largest inflicted round trip time for exchanging payload to or from end XR appliance 117. At act 915, XR processing unit may transmit an a round trip time report towards serving RAN node 105 indicating an identifier corresponding to end XR appliance 117 and the round trip time, corresponding to the end XR appliance, determined at act 910.

On condition of receiving at act 916 multi-modal downlink traffic, or downlink traffic flows, directed to end XR appliance 117, having a certain maximum delay budget(s) to be maintained from the time of receiving the downlink traffic at XR processing unit 115 until uplink traffic corresponding to the downlink traffic is delivered to RAN node 105, the XR processing unit at act 917 may determine two remaining-delay-budget values corresponding to time before the relative downlink-uplink delay budget(s) is/are violated for the flow, or flows. A first remaining-delay-budget value may be used to determine that processing unit 115 is to transmit an uplink traffic delivery mode indication to appliance 117, indicating that the processing unit is to receive, from the appliance, uplink payload, thus consuming a full inter-device round trip time determined at act 910, and that the processing unit is to transmit the received uplink payload via a first/next available CG occasion, configured for multimodal traffic, towards serving RAN node 105. A second remaining-delay-budget value may be used to determine that processing unit 115 is to transmit an uplink traffic delivery mode indication to appliance 117 indicating that the appliance is to directly transmit the uplink traffic to RAN node 105. The uplink traffic delivery mode indication corresponding to determining the second remaining-delay-budget value may be accompanied by an indication that CG uplink resource configured at act 905 are assigned to, or usable by, end XR appliance 117 to transmit uplink payload towards serving RAN node 105. Delivery of the second remaining-delay-budget value by processing unit 115 to end XR appliance 117 may consume less than a full round trip time amount determined at act 910.

On condition of the first determined remaining-delay-budget being zero or more, XR processing unit 115 may transmit at act 920 an uplink traffic delivery mode indication to end XR appliance 117 indicating that the XR processing unit is to relay uplink traffic from the appliance to RAN node 105. At act 930, XR processing unit 115 may receive uplink payload from end XR appliance 117 thus consuming the full inter-device round trip time between processing unit 115 and appliance 117, and at act 935 may transmit the uplink payload received at act 930 via a first available multimodal resource occasion configured at act 905.

On condition of the first determined remaining-delay-budget being less than zero and the second determined remaining-delay-budget being zero or more, at act 940 XR processing unit 115 may transmit to end XR appliance 117 an uplink traffic delivery mode indication indicating that the XR is to transmit multimodal uplink traffic corresponding to downlink traffic received at act 916 to RAN node 105. The uplink traffic delivery mode indication transmitted at act 940 may comprise an indication of uplink CG resource occasion(s) re-assigned to the appliance, thus consuming a portion of the inter-device round trip time that is less that the full roundtrip time determined at act 910. At act 945, end XR appliance 117 may transmit uplink traffic corresponding to downlink traffic received by the XR processing unit 115 at act 916 directly to RAN node 105 according to the reassigned uplink configure grant resource occasions indicated by the XR processing unit to the XR appliance at act 940. It will be appreciated that radio access network node 105 may have independently determined, based at least partially on the roundtrip time value corresponding to appliance 117 transmitted at act 915, weather uplink traffic responsive to the downlink traffic transmitted to the XRP processing unit 115 at act 916 is to be received from the XR processing unit or from the appliance. Thus, additional signaling, and radio frequency and time resources corresponding thereto, to coordinate the mode of transmitting uplink traffic, either via relay by the XR processing unit 115 or via direct transmission by XR appliance 117, are not used.

Figure 10:
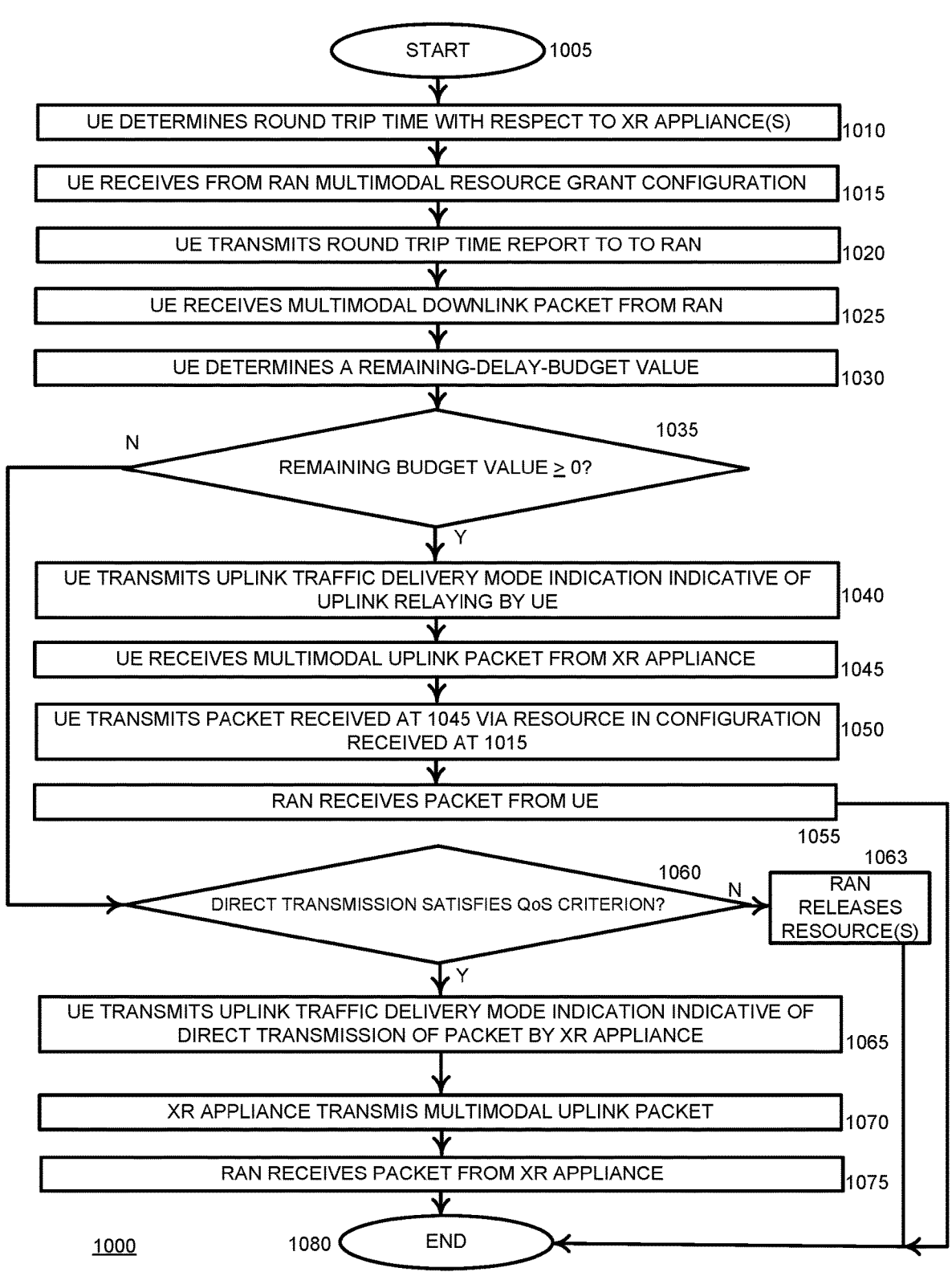
FIG. 10 illustrates a flow diagram of an example embodiment method of facilitating applying a relative quality of service to determine transmission of a related traffic flow.

Turning now to FIG. 10, the figure illustrates a flow diagram of an example embodiment 1000. Method 1000 begins at act 1005. At act 1010, a user equipment, which may be, or which may comprise, an extended reality processing unit, may determine a round trip time with respect to one or more XR appliance(s) that may be communicatively coupled with the extended reality processing unit. At act 1015, the user equipment may receive from a serving radio access network node a multimodal resource grant configuration. The multimodal resource grant configuration may comprise one or more indications of one or more configured grant resource occasions, or resource sets, and an indication whether the one or more configured grant resource occasions, or resource sets, is restricted to multimodal downlink-to-uplink traffic. At act 1020, the user equipment may transmit a round trip time report to the serving radio access network node. The roundtrip time report may comprise a value corresponding to the roundtrip time determined at act 1010. At act 1025, the user equipment may receive a multimodal downlink packet from the serving radio access network node. At act 1030, the user equipment may determine a remaining-delay-budget value. The remaining-delay-budget value may be indicative of a difference between a multimodal relative quality-of-service/latency budget corresponding to the multimodal downlink packet and a sum of a round trip time corresponding to an end XR appliance to which the multimodal downlink packet is directed and a processing time to receive and to decode a multimodal uplink packet, corresponding to the multimodal downlink packet, generated by the end XR appliance.

At act 1035, the user equipment may determine whether the remaining-delay-budget value is greater than or equal to 0. (E.g., transmission of the multimodal uplink packet by the user equipment to the serving radio access network node may correspond to satisfaction of the relative quality-of-service criterion/latency budget.) If a determination is made at act 1035 that transmission of the multimodal uplink packet may correspond to satisfaction of the quality-of-service criterion/latency budget, the user equipment may transmit at act 1040 an uplink traffic delivery mode indication, indicative of uplink relaying of the multimodal uplink packet to the radio access network node by the user equipment. At act 1045, the user equipment may receive a multimodal uplink packet, generated by an XR appliance in response to having received, from the user equipment, the multimodal downlink packet, received by the user equipment at act 1025, to which the multimodal downlink packet is directed. At act 1050, the user equipment may transmit the multimodal uplink packet received at act 1045 to a serving radio access network node via a resource indicated in the configuration information received at 1015 as being usable by the user equipment to transmit only multimodal uplink traffic. Without any messaging between the radio access network node and the user equipment, the radio access network node may independently determine, based on the roundtrip time value contained in the round trip time report received at act 1010 and corresponding to the end XR appliance to which the downlink packet received by the UE at act 1025 is directed, a multimodal uplink resource indicated in the configuration received by the user equipment at act 1015. At act 1055, the radio access network node may receive the packet from the user equipment according to the independently determined multimodal uplink resource, and method 1000 may advance to act 1080 and end.

Returning to description of act 1035, if the user equipment determines that the remaining budget value is less than zero, method 1000 may advance to act 1060. At act 1060, the user equipment may determine whether transmission directly to the serving radio access network node by the end XR appliance to which the downlink packet received by the user equipment at act 1025 is directed corresponds to satisfaction of the relative quality-of-service criterion/latency budget corresponding to the multimodal traffic flow with which the downlink packet received at act 1025 is associated. If the user equipment determines that direct transmission by the end XR appliance of a multimodal uplink packet corresponding to the multimodal downlink packet received at act 1025 would not correspond to satisfaction of the relative quality-of-service criterion/latency budget associated with the multimodal traffic flow, the radio access network node may also make a similar determination based on having received from the user equipment a round trip time corresponding to the XR appliance. Based on the similar determination made by the radio access network node that direct transmission of the multimodal uplink packet would likely not correspond to satisfaction of the quality of service criterion/latency budget, the radio access network node may release at act 1063 a multimodal uplink configure grant resource/occasion that could have been used to transmit the multimodal uplink traffic packet if transmission according to the resource/occasion would correspond to satisfaction of the quality of service criterion/latency budget. Method 1000 advances from act 1063 to act 1080 and ends.

Returning to description of act 1060, if the radio access network node determines that direct transmission of a multimodal uplink packet generated by the end XR appliance responsive to the multimodal downlink traffic packet received by the user equipment in act 1025 would likely correspond to satisfaction of the quality of service criterion/latency budget associated with the multimodal downlink traffic, the user equipment may transmit to the end XR appliance at act 1065 an uplink traffic delivery mode indication indicative that the and XR appliance is to transmit a multimodal uplink packet directly to the serving radio access network node without relaying of the uplink packet being facilitated by the user equipment. At act 1070, the end XR appliance may transmit, to a serving radio access network node, a multimodal uplink packet responsive to having received, from the user equipment, the multimodal downlink packet received by the user equipment at act 1025 using a multimodal uplink configured grant resource indicated to the user equipment in the configuration received at act 1015, which multimodal uplink configure grant resource the user equipment may have indicated to the end XR appliance at act 1065 along with the uplink traffic delivery mode indication. At act 1075, the radio access network node may independently determine, based on the round trip time corresponding to the end XR appliance, that direct transmission by the end XR appliance to the radio access network node would likely correspond to satisfaction of the relative quality-of-service criterion/latency budget corresponding to the multimodal traffic flow, and may receive the multimodal uplink packet transmitted directly by the end XR appliance according to a configured grant uplink resource occasion indicated in the configuration that was transmitted to the user equipment received at act 1015. Method 1000 advances to act 1080 and ends.

Turning now to FIG. 11, the figure illustrates an example embodiment method 1100 comprising at block 1105 receiving, by a user equipment comprising a processor from a radio access network node, a multimodal resource grant configuration comprising at least one multimodal resource grant indication indicative of at least one multimodal resource usable to facilitate delivery of multimodal uplink traffic with respect to at least one extended reality ("XR") appliance; at block 1110 determining, by the user equipment, at least one round trip time value corresponding to at least one communication link associated with the at least one XR appliance; at block 1115 receiving, by the user equipment from the radio access network node, a multimodal downlink traffic protocol data unit, corresponding to at least one multimodal traffic flow, directed to the at least one XR appliance, wherein the at least one multimodal traffic flow is associated with a quality-of-service criterion; at block 1120 analyzing, by the user equipment, the at least one multimodal resource with respect to at least the multimodal downlink traffic protocol data unit and the at least one round trip time value to result in an analyzed at least one multimodal resource; at block 1125 based on the analyzed at least one multimodal resource being determined to satisfy the quality-of-service criterion, determining, by the user equipment, an uplink traffic delivery mode applicable to at least one multimodal uplink traffic protocol data unit, corresponding to the multimodal downlink traffic protocol data unit, to result in a determined uplink traffic delivery mode; and at block 1130 transmitting, by the user equipment to the at least one XR appliance, an uplink traffic delivery mode indication indicative of the determined uplink traffic delivery mode.

Turning now to FIG. 12, the figure illustrates an example extended reality processing unit, comprising at block 1205 a processor configured to process executable instructions that, when executed by the processor, facilitate performance of operations, comprising determining a round trip time value with respect to an XR appliance communicatively coupled with the extended reality processing unit; at block 1210 receiving, from a radio network node, a multimodal resource grant configuration comprising a multimodal resource grant indication indicative of at least one multimodal resource usable to facilitate delivery of multimodal uplink traffic to the radio network node; at block 1215 receiving, from the radio network node, a multimodal downlink packet, corresponding to a multimodal traffic flow, directed to the XR appliance, associated with a quality-of-service criterion; at block 1220 analyzing the at least one multimodal resource at least with respect to the multimodal downlink packet and the round trip time value to result in an analyzed at least one multimodal resource; at block 1225 based on the analyzed at least one multimodal resource being determined to correspond to satisfaction of the quality-of-service criterion, determining an uplink traffic delivery mode applicable to at least one multimodal uplink packet, corresponding to the at least one multimodal downlink packet, to result in a determined uplink traffic delivery mode; and at block 1230 transmitting, to the XR appliance, an uplink traffic delivery mode indication indicative of the determined uplink traffic delivery mode.

Turning now to FIG. 13, the figure illustrates a non-transitory machine-readable medium 1300 comprising at block 1305 executable instructions that, when executed by a processor of an extended reality processing unit, facilitate performance of operations, comprising determining a round trip time value with respect to an XR appliance; at block 1310 receiving, from a radio network node, a multimodal resource grant configuration comprising at least one multimodal resource grant indication indicative of at least one multimodal uplink resource usable to facilitate delivery of multimodal uplink traffic to the radio network node; at block 1315 receiving, from the radio network node, a multimodal downlink packet, corresponding to a multimodal traffic flow, directed to the XR appliance, wherein a quality-of-service criterion is applicable to the multimodal traffic flow; at block 1320 analyzing the at least one multimodal resource at least with respect to the multimodal downlink packet and the round trip time value to result in an analyzed at least one multimodal resource; at block 1325 based on the analyzed at least one multimodal resource being determined to satisfy the quality-of-service criterion, determining an uplink traffic delivery mode, corresponding to the extended reality processing unit, applicable to at least one multimodal uplink packet corresponding to the at least one multimodal downlink packet, to result in a determined uplink traffic delivery mode; and at block 1330 transmitting, to the XR appliance, an uplink traffic delivery mode indication indicative of the determined uplink traffic delivery mode.

Figure 14:
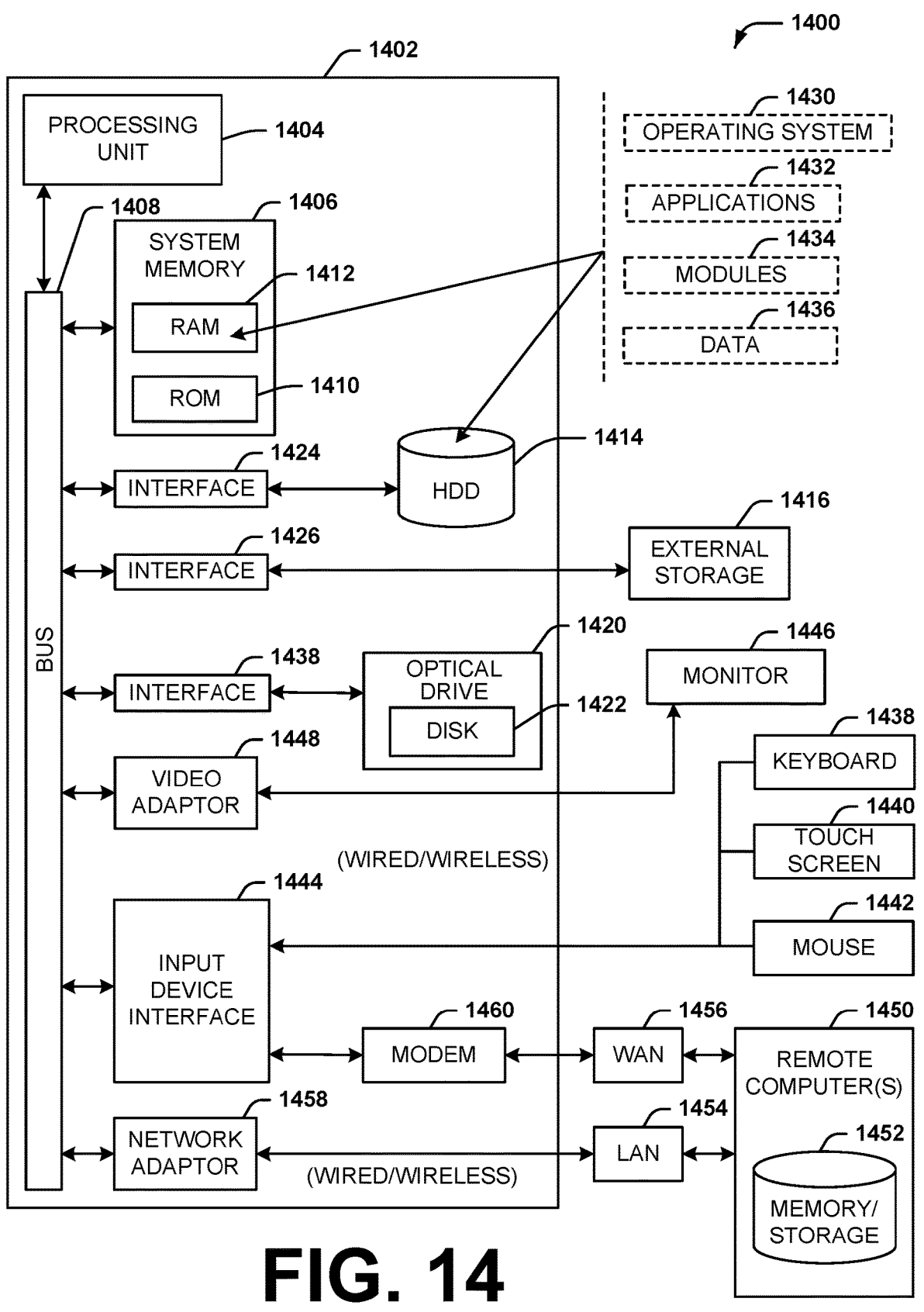
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1410. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/ storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
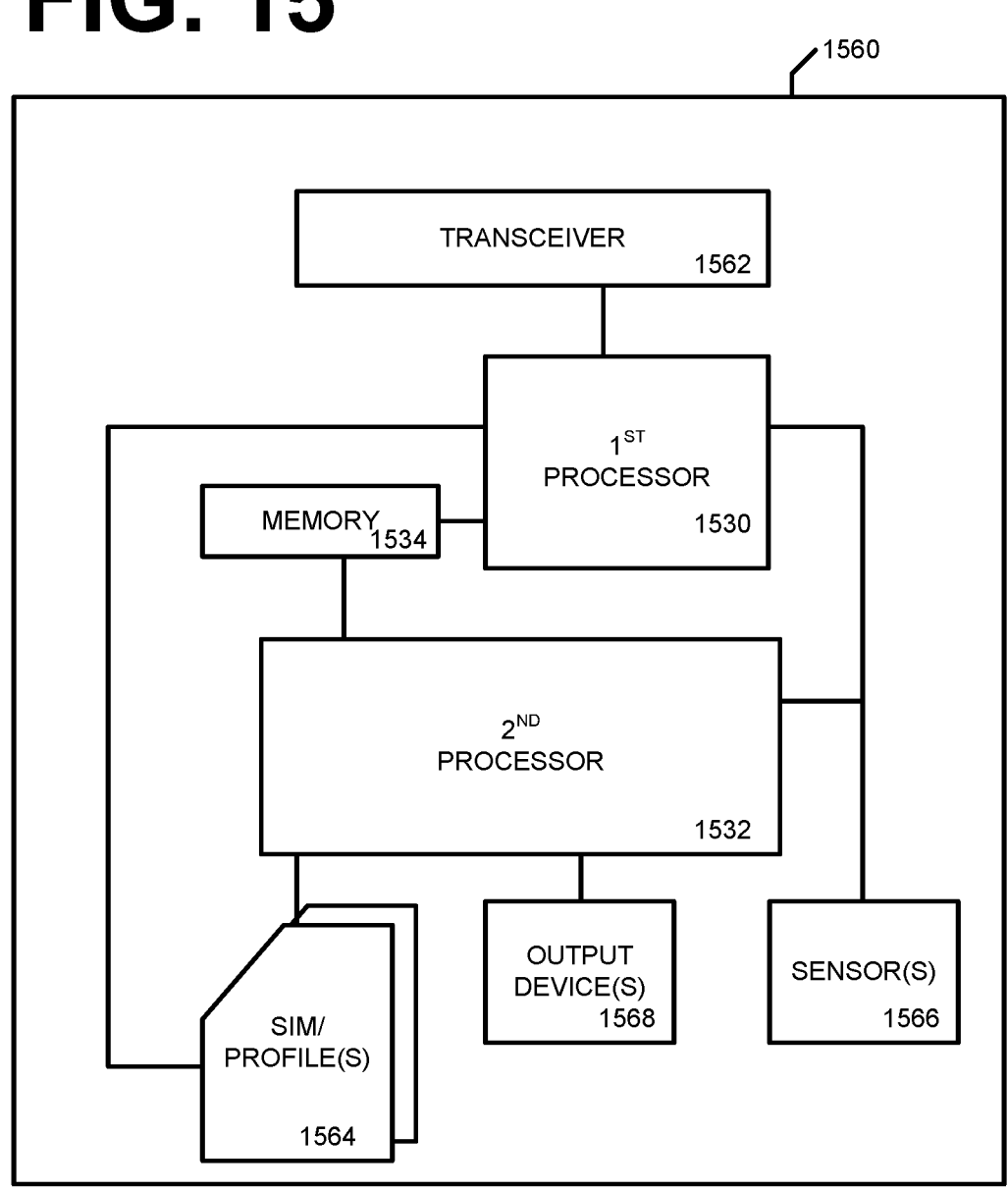
FIG. 15 illustrates a block diagram of an example wireless user equipment.

Turning now to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1562 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 15, UE 1560 may also include a SIM 1564, or a SIM profile, which may comprise information stored in a memory (memory 1534 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or information that may make up an IMSI.

SIM 1564 is shown coupled to both the first processor portion 1530 and the second processor portion 1532. Such an implementation may provide an advantage that first processor portion 1530 may not need to request or receive information or data from SIM 1564 that second processor 1532 may request, thus eliminating the use of the first processor acting as a 'go-between' when the second processor uses information from the SIM in performing its functions and in executing applications. First processor 1530, which may be a modem processor or baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/ inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, that are external to UE 1560.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising a processor from a radio access network node, a multimodal resource grant configuration comprising at least one multimodal resource grant indication indicative of at least one multimodal resource usable to facilitate delivery of multimodal uplink traffic with respect to at least one extended reality ("XR") appliance;

determining, by the user equipment, at least one round trip time value corresponding to at least one communication link associated with the at least one XR appliance;

receiving, by the user equipment from the radio access network node, a multimodal downlink traffic protocol data unit, corresponding to at least one multimodal traffic flow, directed to the at least one XR appliance, wherein the at least one multimodal traffic flow is associated with a quality-of-service criterion;

analyzing, by the user equipment, the at least one multimodal resource with respect to at least the multimodal downlink traffic protocol data unit and the at least one round trip time value to result in an analyzed at least one multimodal resource;

based on the analyzed at least one multimodal resource being determined to satisfy the quality-of-service criterion, determining, by the user equipment, an uplink traffic delivery mode applicable to at least one multimodal uplink traffic protocol data unit, corresponding to the multimodal downlink traffic protocol data unit, to result in a determined uplink traffic delivery mode; and transmitting, by the user equipment to the at least one XR appliance, an uplink traffic delivery mode indication indicative of the determined uplink traffic delivery mode.

2. The method of claim 1, wherein the at least one multimodal resource comprises a periodicity corresponding to the quality-of-service criterion.

3. The method of claim 1, wherein the quality-of-service criterion comprises a multimodal latency corresponding to transmission of the at least one multimodal uplink traffic protocol data unit with respect to the multimodal downlink traffic protocol data unit.

4. The method of claim 1, wherein the uplink traffic delivery mode indication is indicative of the determined uplink traffic delivery mode corresponding to delivery of uplink traffic, generated by the at least one XR appliance and directed to the radio access network node, via the user equipment.

5. The method of claim 4, wherein the quality-of-service criterion comprises a latency, and wherein the analyzing the at least one multimodal resource comprises:

determining, by the user equipment, that transmission, via the user equipment, of the at least one multimodal uplink traffic protocol data unit via a next-occurring uplink transmission occasion of the at least one multimodal resource, occurring next with respect to the receiving of the multimodal downlink traffic protocol data unit and at least the at least one round trip time value, satisfies the quality-of-service criterion.

6. The method of claim 5, further comprising:

receiving, by the user equipment from the at least one XR appliance, the at least one multimodal uplink traffic protocol data unit; and transmitting, by the user equipment to the radio access network node, the at least one multimodal uplink traffic protocol data unit via the next-occurring uplink transmission occasion of the at least one multimodal resource.

7. The method of claim 1, wherein the uplink traffic delivery mode indication is indicative of the determined uplink traffic delivery mode corresponding to delivery to the radio access network node of the at least one multimodal uplink traffic protocol data unit, generated by the at least one XR appliance and directed to the radio access network node, directly by the at least one XR appliance.

8. The method of claim 7, wherein the quality-of-service criterion comprises a latency, and wherein the analyzing the at least one multimodal resource comprises:

determining, by the user equipment, that transmission, by the user equipment, of the at least one multimodal uplink traffic protocol data unit via a next-occurring uplink transmission occasion of the at least one multimodal resource, occurring next with respect to the receiving of the multimodal downlink traffic protocol data unit and at least the at least one round trip time value, fails to satisfy the quality-of-service criterion.

9. The method of claim 8, wherein the uplink traffic delivery mode indication is further indicative of the at least one multimodal resource being usable by the at least one XR appliance to facilitate delivery of the at least one multimodal uplink traffic protocol data unit directly to the radio access network node.

10. The method of claim 8, wherein the uplink traffic delivery mode indication is further indicative of the at least one multimodal resource being unusable by the at least one XR appliance to facilitate delivery of the at least one multimodal uplink traffic protocol data unit directly to the radio access network node.

11. The method of claim 1, further comprising:

transmitting, by the user equipment to the radio access network node, a round trip time report comprising at least one round trip indication indicative of the at least one round trip time value, wherein the at least one round trip time value is usable by the radio access network node to:

determine the determined uplink traffic delivery mode; and receive the at least one multimodal uplink traffic protocol data unit according to the determined uplink traffic delivery mode.

12. An extended reality processing unit, comprising:

a processor configured to process executable instructions that, when executed by the processor, facilitate performance of operations, comprising:

determining a round trip time value with respect to an XR appliance communicatively coupled with the extended reality processing unit;

receiving, from a radio network node, a multimodal resource grant configuration comprising a multimodal resource grant indication indicative of at least one multimodal resource usable to facilitate delivery of multimodal uplink traffic to the radio network node;

receiving, from the radio network node, a multimodal downlink packet, corresponding to a multimodal traffic flow, directed to the XR appliance, associated with a quality-of-service criterion;

analyzing the at least one multimodal resource at least with respect to the multimodal downlink packet and the round trip time value to result in an analyzed at least one multimodal resource;

based on the analyzed at least one multimodal resource being determined to correspond to satisfaction of the quality-of-service criterion, determining an uplink traffic delivery mode applicable to at least one multimodal uplink packet, corresponding to the at least one multimodal downlink packet, to result in a determined uplink traffic delivery mode; and transmitting, to the XR appliance, an uplink traffic delivery mode indication indicative of the determined uplink traffic delivery mode.

13. The extended reality processing unit of claim 12, wherein the uplink traffic delivery mode indication is indicative of the determined uplink traffic delivery mode corresponding to delivery of uplink traffic, generated by the XR appliance and directed to the radio network node, via the extended reality processing unit, and wherein the analyzing the at least one multimodal resource comprises:

determining that transmission, via the extended reality processing unit, of the at least one multimodal uplink packet via a next-occurring uplink transmission occasion of the at least one multimodal resource, occurring next with respect to at least the receiving of the multimodal downlink packet and the round trip time value, corresponds to satisfaction of the quality-of-service criterion.

14. The extended reality processing unit of claim 13, the operations further comprising:

responsive to the transmitting of the uplink traffic delivery mode indication, receiving, from the XR appliance, the at least one multimodal uplink packet; and transmitting, to the radio network node, the at least one multimodal uplink packet via the next-occurring uplink transmission occasion of the at least one multimodal resource.

15. The extended reality processing unit of claim 12, wherein the uplink traffic delivery mode indication is indicative of the determined uplink traffic delivery mode corresponding to delivery, to the radio network node, of the at least one multimodal uplink packet, generated by the XR appliance and directed to the radio network node, directly by the XR appliance, and wherein the analyzing the at least one multimodal resource comprises:

determining that transmission, by the extended reality processing unit, of the at least one multimodal uplink packet via a next-occurring uplink transmission occasion of the at least one multimodal resource, occurring next at least with respect to the receiving of the multimodal downlink packet and the round trip time value, corresponds to failure to satisfy the quality-of-service criterion, wherein the uplink traffic delivery mode indication is further indicative of the at least one multimodal resource being usable by the XR appliance to facilitate delivery of the at least one multimodal uplink packet directly to the radio network node.

16. A non-transitory machine-readable medium, comprising executable instructions that, when executed by a processor of an extended reality processing unit, facilitate performance of operations, comprising:

determining a round trip time value with respect to an XR appliance;

receiving, from a radio network node, a multimodal resource grant configuration comprising at least one multimodal resource grant indication indicative of at least one multimodal uplink resource usable to facilitate delivery of multimodal uplink traffic to the radio network node;

receiving, from the radio network node, a multimodal downlink packet, corresponding to a multimodal traffic flow, directed to the XR appliance, wherein a quality-of-service criterion is applicable to the multimodal traffic flow;

analyzing the at least one multimodal resource at least with respect to the multimodal downlink packet and the round trip time value to result in an analyzed at least one multimodal resource;

based on the analyzed at least one multimodal resource being determined to satisfy the quality-of-service criterion, determining an uplink traffic delivery mode, corresponding to the extended reality processing unit, applicable to at least one multimodal uplink packet corresponding to the at least one multimodal downlink packet, to result in a determined uplink traffic delivery mode; and transmitting, to the XR appliance, an uplink traffic delivery mode indication indicative of the determined uplink traffic delivery mode.

17. The non-transitory machine-readable medium of claim 16, wherein the at least one multimodal uplink resource is usable to transmit multimodal uplink traffic or non-multimodal uplink traffic.

18. The non-transitory machine-readable medium of claim 16, wherein at least one of the at least one multimodal uplink resource is usable, by the extended reality processing unit, only to transmit multimodal uplink traffic.

19. The non-transitory machine-readable medium of claim 18, wherein the at least one of the at least one multimodal uplink resource is a first uplink resource, the operations further comprising:

determining that delivery of the at least one multimodal uplink packet is able to be facilitated by a second uplink resource;

avoiding facilitating transmission of the at least one multimodal uplink packet using the first uplink resource; and facilitating transmission of the at least one multimodal uplink packet using the second uplink resource.

20. The non-transitory machine-readable medium of claim 19, wherein the first uplink resource is usable, by the radio network node, to facilitate delivery of traffic other than traffic corresponding to the multimodal traffic flow.

* * * * *